(12) United States Patent
Yamauchi et al.

(10) Patent No.: US 11,515,546 B2
(45) Date of Patent: Nov. 29, 2022

(54) MEMBRANE ELECTRODE ASSEMBLY OF ELECTROCHEMICAL DEVICE, MEMBRANE ELECTRODE ASSEMBLY OF FUEL CELL, FUEL CELL, MEMBRANE ELECTRODE ASSEMBLY OF ELECTROCHEMICAL HYDROGEN PUMP, ELECTROCHEMICAL HYDROGEN PUMP, MEMBRANE ELECTRODE ASSEMBLY OF HYDROGEN SENSOR, AND HYDROGEN SENSOR

(71) Applicant: Panasonic Intellectual Property Management Co., Ltd., Osaka (JP)

(72) Inventors: Kosuke Yamauchi, Osaka (JP); Takehito Goto, Osaka (JP); Tomoya Kamata, Osaka (JP); Yuichi Mikami, Kyoto (JP); Tomohiro Kuroha, Osaka (JP); Atsuo Okaichi, Osaka (JP); Yoichiro Tsuji, Osaka (JP); Yuji Okuyama, Miyazaki (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 157 days.

(21) Appl. No.: 17/028,009

(22) Filed: Sep. 22, 2020

(65) Prior Publication Data
US 2021/0005899 A1 Jan. 7, 2021

Related U.S. Application Data

(63) Continuation of application No. 15/472,435, filed on Mar. 29, 2017, now Pat. No. 10,826,075.

(30) Foreign Application Priority Data

Apr. 19, 2016 (JP) .................................. 2016-083546
Nov. 18, 2016 (JP) .................................. 2016-224838

(51) Int. Cl.
*H01M 4/90* (2006.01)
*H01M 4/86* (2006.01)
(Continued)

(52) U.S. Cl.
CPC .......... *H01M 4/9066* (2013.01); *C01F 11/00* (2013.01); *C01G 25/006* (2013.01);
(Continued)

(58) Field of Classification Search
CPC ................................................. H01M 4/8652
See application file for complete search history.

(56) References Cited

U.S. PATENT DOCUMENTS 5,314,508 A 5/1994 Taniguchi et al.
2001/0018989 A1 9/2001 Taniguchi
(Continued)

FOREIGN PATENT DOCUMENTS

EP 2908371 A1 8/2015
EP 2937927 A1 10/2015
(Continued)

OTHER PUBLICATIONS

Notice of Allowance issued in related U.S. Appl. No. 15/472,435, dated Sep. 9, 2020.
(Continued)

*Primary Examiner* — Brian R Ohara
(74) *Attorney, Agent, or Firm* — McDermott Will & Emery LLP

(57) ABSTRACT

A membrane electrode assembly of an electrochemical device includes a proton conductive solid electrolyte membrane and an electrode including Ni and an electrolyte material which contains as a primary component, at least one of a first compound having a composition represented by $BaZr_{1-x1}M^1_{x1}O_3$ ($M^1$ represents at least one element selected from trivalent elements each having an ion radius of more (Continued)

than 0.720 A° to less than 0.880 A°, and $0<x_1<1$ holds) and a second compound having a composition represented by $BaZr_{1-x_2}Tm_{x_2}O_3$ ($0<x_2<0.3$ holds).

11 Claims, 15 Drawing Sheets

(51) Int. Cl.
  H01M 8/1213 (2016.01)
  H01M 8/0612 (2016.01)
  H01M 8/1226 (2016.01)
  H01M 8/1246 (2016.01)
  H01M 8/1253 (2016.01)
  H01M 8/12 (2016.01)
  C01F 11/00 (2006.01)
  G01N 27/407 (2006.01)
  C01G 25/00 (2006.01)

(52) U.S. Cl.
  CPC ..... *G01N 27/4074* (2013.01); *G01N 27/4075* (2013.01); *H01M 4/8652* (2013.01); *H01M 8/0618* (2013.01); *H01M 8/1213* (2013.01); *H01M 8/1226* (2013.01); *H01M 8/1246* (2013.01); *H01M 8/1253* (2013.01); *C01P 2002/50* (2013.01); *C01P 2002/54* (2013.01); *C01P 2002/72* (2013.01); *H01M 4/8621* (2013.01); *H01M 2008/1293* (2013.01); *H01M 2300/0074* (2013.01); *Y02E 60/50* (2013.01); *Y02P 70/50* (2015.11)

(56) References Cited

U.S. PATENT DOCUMENTS

| | | | |
|---|---|---|---|
| 2002/0031450 | A1 | 3/2002 | Yamashita et al. |
| 2012/0321990 | A1 | 12/2012 | Chang et al. |
| 2014/0023951 | A1 | 1/2014 | Suzuki et al. |
| 2015/0044596 | A1 | 2/2015 | Hiraiwa et al. |
| 2015/0263355 | A1* | 9/2015 | Hiraiwa ............ H01M 8/04731 429/434 |
| 2016/0204446 | A1 | 7/2016 | Higashino et al. |
| 2017/0301925 | A1 | 10/2017 | Yamauchi et al. |

FOREIGN PATENT DOCUMENTS

| | | | |
|---|---|---|---|
| JP | 2001-307546 A | | 11/2001 |
| JP | 2013-206703 A | | 10/2013 |
| JP | 2015-046251 A | | 3/2015 |
| KR | 20110035681 | * | 4/2011 |
| KR | 20110035681 A | | 4/2011 |
| KR | 20150081928 A | | 7/2015 |

OTHER PUBLICATIONS

Non-Final Office Action issued in related U.S. Appl. No. 15/472,435, dated Apr. 6, 2020.
Final Office Action issued in related U.S. Appl. No. 15/472,435, dated Dec. 17, 2019.
Non-Final Office Action issued in related U.S. Appl. No. 15/472,435, dated Jul. 16, 2019.
Donglin, Microstructure proton concentration and proton conductivity of barium zircon doped with Ho, Er, Tm and Yb, Feb. 5, 2016, Journal of the electrochemical society (Year: 2016).
Non-final Office Action issued in U.S. Appl. No. 15/800,070, dated Jul. 1, 2019.
The Extended European Search Report dated Dec. 19, 2017 for the related European Patent Application No. 17200951.6.
In-situ electrochemical characterization of lab scale PCFCs, METPROCELL, Maria Parco, 2015. Downloaded on Mar. 19, 2019 from: http://www.metprocell.eu/data/METPROCELL-WP4-.
Mouloud Laidoudi, Study of proton conduction in thulium-doped barium zirconates at high temperatures, May 2000, Journal of Physics D: Applied Physics (Year: 2000).
Non-final Office Action issued in U.S. Appl. No. 15/472,435, dated Jul. 16, 2019.
The Extended European Search Report dated Sep. 13, 2017 for the related European Patent Application No. 17165194.6.
Lei Bi et al: "Sinteractivity, proton conductivity and chemical stability of BaZrInO for solid oxide fuel cells (SOFCs)", Solid State Ionics, North Holland Pub. Company. Amsterdam; Nl, Nl, vol. 196, No. 1, Jun. 26, 2011 (Jun. 26, 2011), pp. 59-64, XP028260918.
Yu-Eun Park et al: "Pore structure improvement in cermet for anode-supported protonic ceramic fuel cells", Ceramics International., vol. 39, No. 3, Apr. 1, 2013 (Apr. 1, 2013), pp. 2581-2587, XP055403544.

* cited by examiner

FIG. 18

| DOPANT M | ION RADIUS OF M (Å) | GENERATION OF $BaNiM_2O_5$ |
|---|---|---|
| Sc | 0.745 | NO |
| In | 0.800 | NO |
| Lu | 0.861 | NO |
| Yb | 0.868 | NO |
| Tm | 0.880 | $Tm_{0.20}$: NO |
| | | $Tm_{0.30}$: YES |
| Er | 0.890 | YES |
| Y | 0.900 | YES |
| Ho | 0.901 | YES |
| Dy | 0.912 | YES |
| Gd | 0.938 | YES |

MEMBRANE ELECTRODE ASSEMBLY OF ELECTROCHEMICAL DEVICE, MEMBRANE ELECTRODE ASSEMBLY OF FUEL CELL, FUEL CELL, MEMBRANE ELECTRODE ASSEMBLY OF ELECTROCHEMICAL HYDROGEN PUMP, ELECTROCHEMICAL HYDROGEN PUMP, MEMBRANE ELECTRODE ASSEMBLY OF HYDROGEN SENSOR, AND HYDROGEN SENSOR

CROSS-REFERENCE OF RELATED APPLICATIONS

This application is a Continuation application of U.S. patent application Ser. No. 15/472,435, filed on Mar. 29, 2017, which in turn claims the benefit of Japanese Application No. 2016-083546, filed on Apr. 19, 2016, and Japanese Application No. 2016-224838, filed on Nov. 18, 2016, the entire disclosures of which applications are incorporated by reference herein.

BACKGROUND

1. Technical Field

The present disclosure relates to a membrane electrode assembly of an electrochemical device, a membrane electrode assembly of a fuel cell, a fuel cell, a membrane electrode assembly of an electrochemical hydrogen pump, an electrochemical hydrogen pump, a membrane electrode assembly of a hydrogen sensor, and a hydrogen sensor.

2. Description of the Related Art

As one electrochemical device using an electrolyte material formed of a solid oxide, for example, a solid oxide fuel cell has been known. For an electrolyte material of the solid oxide fuel cell, in general, an oxide ion conductor represented by a stabilized zirconia has been widely used. Since the ion conductivity of the oxide ion conductor is decreased as the temperature is decreased, in a solid oxide fuel cell using a stabilized zirconia as the electrolyte material, for example, an operation temperature of 700° C. or more is required.

However, in an electrochemical device, such as a solid oxide fuel cell, using an electrolyte material formed of a solid oxide, when the operation temperature thereof is increased, for example, since an expensive special heat-resistant metal is required as a metal material used for a structural member, the cost of the entire system may be increased. In addition, when the system is started or stopped, the difference in coefficient of thermal expansion between the structural members is increased, and as a result, cracks are liable to be generated. Hence, a problem in that the reliability of the entire system is degraded may arise in some cases.

Accordingly, as an electrolyte material which increases the reliability of the entire system, for example, there has been proposed an ion conductor formed of a perovskite type oxide having a composition represented by $BaCe_{1-x}M_xO_{3-\alpha}$, $BaZr_{1-x-y}Ce_xM_yO_{3-\alpha}$, or $BaZr_{1-x}M_xO_{3-\alpha}$ (M represents a trivalent substituent element) (for example, see Japanese Unexamined Patent Application Publication No. 2001-307546).

On the other hand, it has been disclosed that since a fuel electrode which contains $BaCe_{1-x}Y_xO_{3-\alpha}$ as a solid electrolyte material and Ni added thereto as a catalyst element is liable to be decomposed by a reaction with $CO_2$, a problem in that the durability of the fuel electrode is not secured may occur (for example, see Japanese Unexamined Patent Application Publication No. 2015-046251). Hence, according to Japanese Unexamined Patent Application Publication No. 2015-046251, a composite material formed of $BaCe_{1-x}Y_xO_{3-\alpha}$ and $BaZr_{1-x}Y_xO_{3-\alpha}$ is used as an electrode material, so that the resistance of the fuel electrode against $CO_2$ is improved.

SUMMARY

However, in the past, the reliability of each of an electrode of an electrochemical device, a membrane electrode assembly thereof, and an electrochemical device has not been sufficiently studied.

One non-limiting and exemplary embodiment provides a membrane electrode assembly of an electrochemical device, a membrane electrode assembly of a fuel cell, a fuel cell, a membrane electrode assembly of an electrochemical hydrogen pump, an electrochemical hydrogen pump, a membrane electrode assembly of a hydrogen sensor, and a hydrogen sensor, the reliability of each of which is improved.

In one general aspect, the techniques disclosed here feature a membrane electrode assembly of an electrochemical device, the membrane electrode assembly comprising: a proton conductive solid electrolyte membrane; and an electrode including Ni and an electrolyte material which contains as a primary component, at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_3$ ($0<x_2<0.3$ holds).

One aspect of the present disclosure is formed as described above, and the reliability of the membrane electrode assembly of the electrochemical device can be advantageously improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 18 is a table showing the correspondence relationship among an element (dopant) doped into $BaZrO_3$, the ion radius (A°) of this element, and the generation of $BaNiM_2O_5$.

Figure 1:
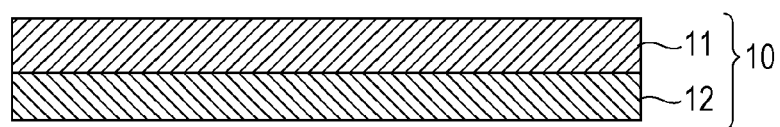
FIG. 1 is a schematic view showing the structure of a membrane electrode assembly of an electrochemical device according to Embodiment 1 of the present disclosure.

DETAILED DESCRIPTION (Findings Underlying the Present Disclosure)

As a solid electrolyte material having excellent water and humidity resistance and improved reliability, Japanese Unexamined Patent Application Publication No. 2001-307546 has disclosed, for example, an ion conductor formed of a perovskite type oxide having a composition represented by $BaZr_{1-x-y}Ce_xM_yO_{3-\alpha}$ or $BaZr_{1-x}M_xO_{3-\alpha}$ (M represents a trivalent substituent element).

On the other hand, Japanese Unexamined Patent Application Publication No. 2015-046251 has disclosed a problem in that since a fuel electrode (anode) formed by addition of Ni as a catalyst component to $BaCe_{1-x}Y_xO_{3-\alpha}$ (BCY) known as a solid electrolyte material of a solid oxide fuel cell is liable to be decomposed by a reaction with $CO_2$, the durability of the anode cannot be secured. In addition, in order to solve this problem, an electrode material having the following composition has been proposed.

That is, in Japanese Unexamined Patent Application Publication No. 2015-046251, the use of a composite material formed of $BaCe_{1-x}Y_xO_{3-\alpha}$ (BCY) and $BaZr_{1-x}Y_xO_{3-\alpha}$ (BZY) as a material for a fuel electrode has been proposed. Hence, according to Japanese Unexamined Patent Application Publication No. 2015-046251, the resistance of the fuel electrode against $CO_2$ is improved.

Through intensive research carried out by the present inventors on the related ion conductor and electrode material described above, the following findings were obtained.

That is, the present inventors found that when the ion conductor disclosed in Japanese Unexamined Patent Application Publication No. 2001-307546 is used for an electrochemical device, and when the material for a fuel electrode disclosed in Japanese Unexamined Patent Application Publication No. 2015-046251 is used for an electrochemical device, in both of the cases described above, the durability of the electrochemical device is degraded under certain conditions.

In particular, the present inventors found that when the electrode (such as an anode of a solid oxide fuel cell) of an electrochemical device contains $BaZr_{1-x}Y_xO_{3-\alpha}$ and Ni, $BaZr_{1-x}Y_xO_{3-\alpha}$ and Ni perform a chemical reaction, and hence, $BaNiY_2O_5$ is generated. Furthermore, it is believed that $BaNiY_2O_5$ thus generated is decomposed, for example, by a reaction with $CO_2$ contained in a hydrogen-containing gas to be supplied to the anode. Accordingly, the present inventors found that the durability of an electrode containing $BaZr_{1-x}Y_xO_{3-\alpha}$ and Ni is disadvantageously degraded when $CO_2$ is contained in a hydrogen-containing gas.

Accordingly, as for an electrode of an electrochemical device including Ni and compound having a composition represented by $BaZr_{1-x}M_xO_{3-\alpha}$, an element M which improves the durability of the electrode was studied by the present inventors, and as a result, the present disclosure was finally made.

That is, the present inventors found that as a compound which is contained in an electrode of an electrochemical device and which has a composition represented by $BaZr_{1-x}M_xO_{3-\alpha}$, when at least one of a first compound in which M is at least one element selected from trivalent elements each having an ion radius of more than 0.720 A° to less than 0.880 A° (0<$x_1$<1 holds) and a second compound having a composition represented by $BaZr_{1-x2}Tm_{x2}O_{3-\alpha}$ (0<$x_2$<0.3 holds) is used, the durability of the electrode is improved. The reason for this is believed that when at least one of the first compound in which M is at least one element selected from trivalent elements each having an ion radius of more than 0.720 A° to less than 0.880 A° (0<$x_1$<1 holds) and the second compound having a composition represented by $BaZr_{1-x2}Tm_{x2}O_{3-\alpha}$ (0<$x_2$<0.3 holds) is used, a reaction between Ni and the first compound and/or the second compound is suppressed, and hence, $BaNiM_2O_5$ and/or $BaNiTm_2O_5$, each of which is to be decomposed by a reaction with $CO_2$, is not generated.

The finding of the present inventors described above has not been discovered in the past and has novel technical features exhibiting significant operational advantages. Hence, the present disclosure provides the following concrete aspects.

A membrane electrode assembly of an electrochemical device according to a first aspect of the present disclosure comprises: a proton conductive solid electrolyte membrane and an electrode including Ni and an electrolyte material which contains as a primary component, at least one of a first compound having a composition represented by $BaZr_{1-x1}M^1_{x1}O_{3-\alpha}$ ($M^1$ represents at least one element selected from trivalent elements each having an ion radius of more than 0.720 A° to less than 0.880 A°, and 0<$x_1$<1 holds) and a second compound having a composition represented by $BaZr_{1-x2}Tm_{x2}O_{3-\alpha}$ ($0<x_2<0.3$ holds).

In the first aspect, the electrolyte material containing as the primary component, at least one of the first compound and the second compound is a material in which in the electrolyte material forming the electrode, the first compound, the second compound, or a composite compound of the first compound and the second compound has the largest content.

According to the structure described above, since the electrode forming the membrane electrode assembly of the electrochemical device includes Ni and the electrolyte material containing as the primary component, at least one of the first compound having a composition represented by $BaZr_{1-x1}M^1_{x1}O_{3-\alpha}$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when this electrode is synthesized, $BaNiM^1_2O_5$ and/or $BaNiTm_2O_5$ is suppressed from being generated.

That is, in a $CO_2$-containing atmosphere, a compound to be decomposed by a reaction with $CO_2$ can be suppressed from being generated when the electrode is synthesized, and the durability of the membrane electrode assembly of the electrochemical device can be improved.

Hence, the reliability of the membrane electrode assembly of the electrochemical device according to the first aspect of the present disclosure can be improved.

In addition, a membrane electrode assembly of an electrochemical device according to a second aspect of the present disclosure may be formed so that in the above first aspect, the electrode contains no third compound having a composition represented by $BaZr_{1-x3}M^3_{x3}O_{3-\alpha}$ ($M^3$ represents at least one element selected from Er, Y, Ho, Dy, and Gd, and $0<x_3<1$ holds).

By the structure as described above, since the electrode contains no third compound described above, the compound to be decomposed by a reaction with $CO_2$ is suppressed from being generated when the electrode is synthesized, and the durability of the membrane electrode assembly of the electrochemical device can be improved.

In addition, in a membrane electrode assembly of an electrochemical device according to a third aspect of the present disclosure, $M^1$ according to the above first or second aspect may be at least one element selected from Sc, In, Lu, and Yb.

A membrane electrode assembly of an electrochemical device according to a fourth aspect of the present disclosure may be formed so that in one of the first to the third aspects described above, as the solid electrolyte membrane described above, a first solid electrolyte membrane including an electrolyte material which contains as a primary component, at least one of a fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and a fifth compound having a composition represented by $BaZr_{1-x5}Tm_{x5}O_3$ ($0<x_5<0.3$ holds) is included, and the electrode and the first solid electrolyte membrane are in contact with each other.

In this case, the electrolyte material containing as the primary component, at least one of the fourth compound and the fifth compound is a material in which in the electrolyte material forming the first solid electrolyte membrane, the fourth compound, the fifth compound, or a composite compound formed of the fourth compound and the fifth compound has the largest content.

According to the above composition, the electrode forming the membrane electrode assembly of the electrochemical device includes Ni and the electrolyte material containing as the primary component, at least one of the first compound and the second compound. Hence, when this electrode is synthesized, the compound to be decomposed by a reaction with $CO_2$ can be suppressed from being generated.

In addition, the first solid electrolyte membrane includes the electrolyte material containing as the primary component, at least one of the fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and the fifth compound having a composition represented by $BaZr_{1-x5}Tm_{x5}O_3$ ($0<x_5<0.3$ holds). Hence, in the first solid electrolyte membrane, the generation of $BaNiM^4_2O_5$ and/or $BaNiTm_2O_5$, which is caused by a reaction with Ni contained in the electrode in contact with the first solid electrolyte membrane, is suppressed.

That is, in the membrane electrode assembly of the electrochemical device according to the fourth aspect of the present disclosure, the generation of the compound to be decomposed by a reaction with $CO_2$, which is caused by a reaction with Ni, can be suppressed when the electrode is synthesized. Furthermore, in the first solid electrolyte membrane, the generation of the compound to be decomposed by a reaction with $CO_2$, which is caused by a reaction with Ni contained in the adjacent electrode, can be suppressed.

Hence, the durability of the electrode and the first solid electrolyte membrane of the membrane electrode assembly of the electrochemical device can be improved. Accordingly, the reliability of the membrane electrode assembly of the electrochemical device according to the fourth aspect of the present disclosure can improved.

A membrane electrode assembly of an electrochemical device according to a fifth aspect of the present disclosure may be formed so that in the fourth aspect described above, $M^4$ represents at least one element selected from Sc, In, Lu, and Yb.

A membrane electrode assembly of an electrochemical device according to a sixth aspect of the present disclosure may be formed so that in the fourth or the fifth aspect described above, a second solid electrolyte membrane containing a sixth compound having a composition represented by one of $BaZr_{1-x6}M^6_{x6}O_3$, $BaCe_{1-x7}M^7_{x7}O_3$, and $BaZr_{1-x8-y8}Ce_{x8}M^8_{y8}O_3$ ($M^6$, $M^7$, and $M^8$ each represent at least one element selected from La, Pr, Nd, Pm, Sm, Eu, Gd, Tb, Dy, Ho, Er, Tm, Yb, Y, Sc, Mn, Fe, Co, Ni, Al, Ga, In, and Lu, and $0<x_6<1$, $0<x_7<1$, $0<x_8<1$, and $0<y_8<1$ hold) is further included as the solid electrolyte membrane; the first solid electrolyte membrane is in contact at one side surface thereof with the electrode and is in contact with the second solid electrolyte membrane at the other side surface opposite to the one side surface described above; and the electrode, the first solid electrolyte membrane, and the second solid electrolyte membrane are laminated to each other in this order.

According to the structure described above, between the electrode and the second solid electrolyte membrane, each of which forms the membrane electrode assembly of the electrochemical device, the first solid electrolyte membrane is provided. Hence, even if the second solid electrolyte membrane is formed of a composition which by a reaction with Ni contained in the electrode, generates the compound to be decomposed by a reaction with $CO_2$, the reaction with Ni can be prevented by the first solid electrolyte membrane.

Hence, the durability of the second solid electrolyte membrane can be improved, and furthermore, the range of selection of the composition of the second solid electrolyte membrane can be increased.

A membrane electrode assembly of an electrochemical device according to a seventh aspect of the present disclosure may be formed so that in one of the first to the sixth aspects described above, $M^1$ represents Yb, and the range of $x_1$ satisfies $0<x_1<0.6$.

A membrane electrode assembly of a fuel cell according to an eighth aspect of the present disclosure includes a proton conductive solid electrolyte membrane and an anode including Ni and an electrolyte material which contains as a primary component, at least one of a first compound having a composition represented by $BaZr_{1-x1}M^1_{x1}O_{3-\alpha}$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds).

In this case, the electrolyte material containing as the primary component, at least one of the first compound and the second compound is a material in which in the electrolyte material forming the anode, the first compound, the second compound, or a composite compound formed of the first compound and the second compound has the largest content. According to the structure described above, since the anode forming the membrane electrode assembly of the fuel cell includes Ni and the electrolyte material containing as the primary component, at least one of the first compound having a composition represented by $BaZr_{1-x1}M^1_{x1}O_{3-\alpha}$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the anode is synthesized, $BaNiM^1_2O_5$ and/or $BaNiTm_2O_5$ can be suppressed from being generated.

That is, in a $CO_2$-containing atmosphere, since a compound to be decomposed by a reaction with $CO_2$ can be suppressed from being generated when the anode is synthesized, the durability of the membrane electrode assembly of the fuel cell can be improved.

Accordingly, the reliability of the membrane electrode assembly of the fuel cell according to the eighth aspect of the present disclosure can be improved.

A membrane electrode assembly of a fuel cell according to a ninth aspect of the present disclosure may be formed so that in the eighth aspect described above, the anode may contain no third compound having a composition represented by $BaZr_{1-x3}M^3_{x3}O_3$ ($M^3$ represents at least one element selected from Er, Y, Ho, Dy, and Gd, and $0<x_3<1$ holds).

By the structure as described above, since the anode includes no third compound described above, the compound to be decomposed by a reaction with $CO_2$ can be suppressed from being generated when the electrode is synthesized, and the durability of the membrane electrode assembly of the fuel cell can be improved.

A membrane electrode assembly of a fuel cell according to a tenth aspect of the present disclosure may be formed so that in the eighth or the ninth aspect described above, $M^1$ represents at least one element selected from Sc, In, Lu, and Yb.

A membrane electrode assembly of a fuel cell according to an eleventh aspect of the present disclosure may be formed so that in one of the above eighth to tenth aspects, as the solid electrolyte membrane, a first solid electrolyte membrane including an electrolyte material which contains as a primary component, at least one of a fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and a fifth compound having a composition represented by $BaZr_{1-x5}Tm_{x5}O_3$ ($0<x_5<0.3$ holds), and the anode is in contact with the first solid electrolyte membrane.

In this case, the electrolyte material containing as the primary component, at least one of the fourth compound and the fifth compound is a material in which in the electrolyte material forming the first solid electrolyte membrane, the fourth compound, the fifth compound, or a composite compound formed of the fourth compound and the fifth compound has the largest content. According to the structure described above, the anode includes Ni and the electrolyte material containing as the primary component, at least one of the first compound described above and the second compound described above. Hence, when the anode forming the membrane electrode assembly of the fuel cell is synthesized, $BaNiM^1_2O_5$ and/or $BaNiTm_2O_5$, which is to be decomposed by a reaction with $CO_2$, can be suppressed from being generated.

In addition, the first solid electrolyte membrane includes the electrolyte material containing as the primary component, at least one of the fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and the fifth compound having a composition represented by $BaZr_{1-x5}Tm_{x5}O_{3-\alpha}$ ($0<x_5<0.3$ holds). Hence, in the first solid electrolyte membrane, the generation of $BaNiM^4_2O_5$ and/or $BaNiTm_2O_5$, which is caused by a reaction with Ni contained in the anode of the fuel cell in contact with the first solid electrolyte membrane, can be suppressed.

That is, in the membrane electrode assembly of the fuel cell according to the eleventh aspect of the present disclosure, the generation of the compound to be decomposed by a reaction with $CO_2$, which is caused by a reaction with Ni, can be suppressed when the anode is synthesized. Furthermore, in the first solid electrolyte membrane, the generation of the compound to be decomposed by a reaction with $CO_2$, which is caused by a reaction with Ni contained in the adjacent anode, can be suppressed.

Hence, the durability of the anode and the first solid electrolyte membrane of the fuel cell can be improved. Accordingly, the reliability in durability of the membrane electrode assembly of the fuel cell according to the eleventh aspect of the present disclosure can be improved.

A membrane electrode assembly of a fuel cell according to a twelfth aspect of the present disclosure may be formed so that in the above eleventh aspect, $M^4$ may represent at least one element selected from Sc, In, Lu, and Yb.

A membrane electrode assembly of a fuel cell device according to a thirteenth aspect of the present disclosure may be formed so that in the eleventh or the twelfth aspect described above, as the solid electrolyte membrane, a second solid electrolyte membrane containing a sixth compound having a composition represented by one of $BaZr_{1-x6}M^6_{x6}O_3$, $BaCe_{1-x7}M^7_{x7}O_3$, and $BaZr_{1-x8-y8}Ce_{x8}M^8_{y8}O_3$ ($M^6$, $M^7$, and $M^8$ each represent at least one element selected from La, Pr, Nd, Pm, Sm, Eu, Gd, Tb, Dy, Ho, Er, Tm, Yb, Y, Sc, Mn, Fe, Co, Ni, Al, Ga, In, and Lu, and $0<x_6<1$, $0<x_7<1$, $0<x_8<1$, and $0<y_8<1$ hold) is further included; the first solid electrolyte membrane is in contact at one side surface thereof with the anode and is in contact with the second solid electrolyte membrane at the other side surface opposite to the one side surface described above; and the anode, the first solid electrolyte membrane, and the second solid electrolyte membrane are laminated to each other in this order.

According to the structure described above, between the anode and the second solid electrolyte membrane, the first solid electrolyte membrane is provided. Hence, even if the second solid electrolyte membrane is formed of a composition which by a reaction with Ni contained in the anode, generates the compound to be decomposed by a reaction with $CO_2$, the reaction with Ni can be prevented by the first solid electrolyte membrane.

Hence, the durability of the second solid electrolyte membrane can be improved, and furthermore, the range of selection of the composition of the second solid electrolyte membrane can be increased.

A membrane electrode assembly of a fuel cell according to a fourteenth aspect of the present disclosure may be formed so that in one of the above eighth to thirteenth aspects, $M^1$ represents Yb, and the range of $x_1$ satisfies $0<x_1<0.6$.

A fuel cell according to a fifteenth aspect of the present disclosure comprises: a membrane electrode assembly including a proton conductive solid electrolyte membrane and an anode which includes Ni and an electrolyte material containing as a primary component, at least one of a first compound having a composition represented by $BaZr_{1-x1}M^1{}_{x1}O_{3-\alpha}$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds); a cathode; an anode gas path supplying a hydrogen-containing gas to the anode; a cathode gas path supplying an oxidant gas to the cathode. The solid electrolyte membrane described above is in contact at one side surface thereof with the anode of the fuel cell and is in contact with the cathode at the other side surface opposite to the one side surface described above; the anode, the solid electrolyte membrane, and the cathode are laminated to each other in this order; and the hydrogen-containing gas contains $CO_2$.

According to the structure described above, since the anode of the fuel cell includes Ni and the electrolyte material containing as the primary component, at least one of the first compound having a composition represented by $BaZr_{1-x1}M^1{}_{x1}O_{3-\alpha}$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the anode forming the membrane electrode assembly of the fuel cell is synthesized, $BaNiM^1{}_2O_5$ and/or $BaNiTm_2O_5$ can be suppressed from being generated.

That is, in a $CO_2$-containing atmosphere, since the compound to be decomposed by a reaction with $CO_2$ can be suppressed from being generated when the anode is synthesized, the durability of the membrane electrode assembly of the fuel cell can be improved.

Accordingly, the reliability of the fuel cell according to the fifteenth aspect of the present disclosure can be improved.

A fuel cell according to a sixteenth aspect of the present disclosure may be formed so that in the above fifteenth aspect, a reformer which reforms a raw material to be supplied and which generates the hydrogen-containing gas may also be included.

According to the structure described above, since the reformer is included, a raw material to be supplied from the outside can be reformed, and a hydrogen-containing gas can be generated. In addition, the hydrogen-containing gas generated in this case may contain $CO_2$ which is generated by a reforming reaction in some cases. However, in the fuel cell, when the anode is synthesized, the compound to be decomposed by a reaction with $CO_2$ can be suppressed from being generated.

Hence, even when a hydrogen-containing gas generated by the reformer is supplied to the anode, the anode is not decomposed by $CO_2$ contained in the hydrogen-containing gas described above.

Accordingly, the reliability of the fuel cell according to the sixteenth aspect of the present disclosure can be improved.

A membrane electrode assembly of an electrochemical hydrogen pump according to a seventeenth aspect of the present disclosure comprises a proton conductive solid electrolyte membrane and an anode including Ni and an electrolyte material which contains as a primary component, at least one of a first compound having a composition represented by $BaZr_{1-x1}M^1{}_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds).

In this case, the electrolyte material containing as the primary component, at least one of the first compound and the second compound is a material in which as the electrolyte material forming the anode, the first compound, the second compound, or a composite compound formed of the first compound and the second compound has the largest content.

According to the structure described above, since the anode of the electrochemical hydrogen pump includes Ni and the electrolyte material containing as the primary component, at least one of the first compound having a composition represented by $BaZr_{1-x1}M^1{}_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the anode forming the membrane electrode assembly of the electrochemical hydrogen pump is synthesized, $BaNiM^1{}_2O_5$ and/or $BaNiTm_2O_5$ can be suppressed from being generated.

That is, in a $CO_2$-containing atmosphere, the compound to be decomposed by a reaction with $CO_2$ can be suppressed from being generated when the anode is synthesized, and the durability of the membrane electrode assembly of the electrochemical hydrogen pump can be improved.

Hence, the reliability of the membrane electrode assembly of the electrochemical hydrogen pump according to the seventeenth aspect of the present disclosure can be improved.

A membrane electrode assembly of an electrochemical hydrogen pump according to an eighteenth aspect of the present disclosure may be formed so that in the above seventeenth aspect, the anode contains no third compound having a composition represented by $BaZr_{1-x3}M^3_{x3}O_3$ ($M^3$ represents at least one element selected from Er, Y, Ho, Dy, and Gd, and $0<x_3<1$ holds).

By the structure as described above, since the anode contains no third compound described above, the compound to be decomposed by a reaction with $CO_2$ can be suppressed from being generated when the electrode is synthesized, and the durability of the membrane electrode assembly of the electrochemical hydrogen pump can be improved.

An electrochemical hydrogen pump according to a nineteenth aspect of the present disclosure comprises: a membrane electrode assembly including a proton conductive solid electrolyte membrane and an anode including Ni and an electrolyte material which contains as a primary component, at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds); a cathode; an exterior power source enabling a current to flow to the anode and the cathode; and an anode gas path supplying a hydrogen-containing gas to the anode. The solid electrolyte membrane described above is in contact at one side surface thereof with the anode and is in contact with the cathode at the other side surface opposite to the one side surface described above; the anode, the solid electrolyte membrane, and the cathode are laminated to each other in this order; and the hydrogen-containing gas contains $CO_2$.

According to the structure described above, since the anode of the electrochemical hydrogen pump includes Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the anode forming the membrane electrode assembly of the electrochemical hydrogen pump is synthesized, $BaNiM^1_2O_5$ and/or $BaNiTm_2O_5$ can be suppressed from being generated.

That is, in a $CO_2$-containing atmosphere, the compound to be decomposed by a reaction with $CO_2$ can be suppressed from being generated when the anode is synthesized, and the durability of the membrane electrode assembly of the electrochemical hydrogen pump can be improved.

Hence, the reliability of the electrochemical hydrogen pump according to the nineteenth aspect of the present disclosure can be improved.

An electrochemical hydrogen pump according to a twentieth aspect of the present disclosure may be formed so that in the above nineteenth aspect, a reformer which reforms a raw material to be supplied and generates the hydrogen-containing gas is included.

Since the reformer is included in the above structure, a raw material supplied from the outside can be reformed, and a hydrogen-containing gas can be generated. In addition, the hydrogen-containing gas generated in this case may contain $CO_2$ in some cases by a reaction between CO generated by a reforming reaction and water added to the raw material. However, in the electrochemical hydrogen pump, when the anode is synthesized, the compound to be decomposed by a reaction with $CO_2$ can be suppressed from being generated.

Hence, even when a hydrogen-containing gas generated by the reformer is supplied to the anode, the anode is not decomposed by $CO_2$ contained in this hydrogen-containing gas.

Accordingly, the reliability of the electrochemical hydrogen pump according to the twentieth aspect of the present disclosure can be improved.

A membrane electrode assembly of a hydrogen sensor according to a twenty-first aspect of the present disclosure comprises a proton conductive solid electrolyte membrane and an electrode including Ni and an electrolyte material which contains as a primary component, at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds).

In this case, the electrolyte material containing as the primary component, at least one of the first compound and the second compound is a material in which in the electrolyte material forming the electrode, the first compound, the second compound, or a composite compound formed of the first compound and the second compound has the largest content.

According to the structure described above, since the electrode forming the membrane electrode assembly of the hydrogen sensor includes Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the electrode forming the membrane electrode assembly of the hydrogen sensor is synthesized, $BaNiM^1_2O_5$ and/or $BaNiTm_2O_5$ can be suppressed from being generated.

That is, in a $CO_2$-containing atmosphere, the compound to be decomposed by a reaction with $CO_2$ can be suppressed from being generated when the electrode is synthesized, and the durability of the membrane electrode assembly of the hydrogen sensor can be improved.

Hence, the reliability of the membrane electrode assembly of the hydrogen sensor according to the twenty-first aspect of the present disclosure can be improved.

A membrane electrode assembly of a hydrogen sensor according to a twenty-second aspect of the present disclosure may be formed so that in the above twenty-first aspect, the electrode contains no third compound having a composition represented by $BaZr_{1-x3}M^3_{x3}O_3$ ($M^3$ represents at least one element selected from Er, Y, Ho, Dy, and Gd, and $0<x_3<1$ holds).

By the structure described above, since the electrode contains no third compound, the compound to be decomposed by a reaction with $CO_2$ can be suppressed from being generated when the electrode is synthesized, and the durability of the membrane electrode assembly of the hydrogen sensor can be improved.

A hydrogen sensor according to a twenty-third aspect of the present disclosure comprises a membrane electrode assembly including a proton conductive solid electrolyte membrane and an electrode including Ni and an electrolyte material which contains as a primary component, at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds).

According to the structure described above, since the electrode forming the membrane electrode assembly of the hydrogen sensor includes Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds), when the electrode is synthesized, $BaNiM^1_2O_5$ and/or $BaNiTm_2O_5$ can be suppressed from being generated.

Accordingly, even when a hydrogen-containing gas containing $CO_2$ is supplied to the electrode, the compound to be decomposed by a reaction with $CO_2$ can be suppressed from being generated when the electrode is synthesized, and the durability of the membrane electrode assembly of the hydrogen sensor can be improved.

Hence, the reliability of the hydrogen sensor according to the twenty-third aspect of the present disclosure can be improved.

Hereinafter, embodiments of the present disclosure will be described with reference to the drawings. Incidentally, through all the following drawings, the same or similar constituent members are designated by the same reference numeral, and description thereof may be omitted in some cases.

Embodiment 1

A membrane electrode assembly 10 of an electrochemical device according to Embodiment 1 of the present disclosure will be described with reference to FIG. 1. FIG. 1 is a schematic view showing the structure of the membrane electrode assembly 10 of the electrochemical device according to Embodiment 1 of the present disclosure. The electrochemical device is a device using a chemical reaction or a chemical phenomenon together with an electrical phenomenon, and for example, a fuel cell, an electrochemical hydrogen pump, or a hydrogen sensor may be mentioned.

As shown in FIG. 1, the membrane electrode assembly 10 includes an electrode 11 and a first solid electrolyte membrane 12 and has the structure in which the electrode 11 and the first solid electrolyte membrane 12 are in contact with each other. In other words, the membrane electrode assembly 10 has the structure in which the electrode 11 is laminated to the first solid electrolyte membrane 12 at one side surface thereof.

The electrode 11 includes Ni and an electrolyte material containing as a primary component, at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_{3-\alpha}$ ($0<x_2<0.3$ holds). In addition, $M^1$ may represent at least one element selected from Sc, In, Lu, and Yb. In particular, $M^1$ may represent Yb, and the range of $x_1$ may satisfy $0<x_1<0.6$. Hence, the generation of a compound, such as $BaNiM^1_2O_5$ and/or $BaNiTm_2O_5$, to be decomposed by a reaction with $CO_2$, which is caused by a reaction with Ni, can be suppressed when the electrode 11 is synthesized.

In addition, the electrode 11 may be formed so that a third compound having a composition represented by $BaZr_{1-x3}M^3_{x3}O_3$ ($M^3$ represents at least one element selected from Er, Y, Ho, Dy, and Gd, and $0<x_3<1$ holds) is not contained. When the electrode 11 contains no third compound, the generation of a compound, such as $BaNiM^3_2O_5$, to be decomposed by a reaction with $CO_2$, which is caused by a reaction with Ni, can be suppressed when the electrode 11 is synthesized.

Accordingly, in a $CO_2$-containing atmosphere, since the compound to be decomposed by a reaction with $CO_2$ can be suppressed from being generated when the electrode 11 is synthesized, the durability of the electrode 11 of the electrochemical device can be improved.

The first solid electrolyte membrane 12 is a proton conductive solid electrolyte membrane and includes an electrolyte material containing as a primary component, at least one of a fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_1<1$ holds) and a fifth compound having a composition represented by $BaZr_{1-x5}Tm_{x5}O_3$ ($0<x_5<0.3$ holds). In addition, $M^4$ represents at least one element selected from Sc, In, Lu, and Yb.

Hence, the first solid electrolyte membrane 12 can suppress the generation of a compound, such as $BaNiM^4_2O_5$ and/or $BaNiTm_2O_5$, to be decomposed by a reaction with $CO_2$, which is caused by a reaction with Ni contained in the adjacent electrode 11.

Furthermore, the first solid electrolyte membrane 12 may be formed so that the third compound is not contained. When the first solid electrolyte membrane 12 contains no third compound, the generation of a compound, such as $BaNiM^3_2O_5$, to be decomposed by a reaction with $CO_2$, which is caused by a reaction with Ni contained in the adjacent electrode 11, can be suppressed.

As described above, the first solid electrolyte membrane 12 can suppress the generation of the compound to be decomposed by a reaction with $CO_2$, which is caused by a reaction with Ni contained in the adjacent electrode 11. Hence, the durability of the electrode 11 and the first solid electrolyte membrane 12 of the electrochemical device can be improved.

In addition, when an electrochemical device including the membrane electrode assembly 10 is used, for example, as a solid oxide fuel cell, the power generation is performed in such a way that a hydrogen-containing gas is supplied to one side surface of the first solid electrolyte membrane 12 on which the electrode 11 is provided, and an oxidant gas is supplied to the other side surface of the first solid electrolyte membrane 12 on which the electrode 11 is not provided. Hence, when the electrochemical device is a solid oxide fuel cell, the first solid electrolyte membrane 12 is required to have a gas-tight structure.

In addition, the thickness of the first solid electrolyte membrane 12 according to Embodiment 1 of the present disclosure may be, for example, 5 to 30 μm.

Modified Example of Embodiment 1

Figure 2:
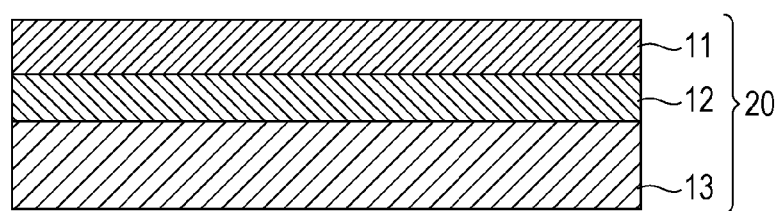
FIG. 2 is a schematic view showing the structure of a membrane electrode assembly of an electrochemical device according to a modified example of Embodiment 1 of the present disclosure.

Next, a membrane electrode assembly 20 of an electrochemical device according to a modified example of Embodiment 1 of the present disclosure will be described with reference to FIG. 2. FIG. 2 is a schematic view showing the structure of the membrane electrode assembly 20 of the electrochemical device according to the modified example of Embodiment 1 of the present disclosure.

The membrane electrode assembly 20 includes an electrode 11, a first solid electrolyte membrane 12, and a second solid electrolyte membrane 13 and is formed so that the first solid electrolyte membrane 12 is in contact at one side surface thereof with the electrode 11 and is in contact with the second solid electrolyte membrane 13 at the other side surface opposite to the one side surface described above. In addition, the electrode 11, the first solid electrolyte membrane 12, and the second solid electrolyte membrane 13 are laminated to each other in this order. That is, the membrane electrode assembly 20 according to the modified example of Embodiment 1 further includes the second solid electrolyte membrane 13 as compared to the structure of the membrane electrode assembly 10 of Embodiment 1.

Since the electrode 11 and the first solid electrolyte membrane 12 of the membrane electrode assembly 20 according to the modified example of Embodiment 1 are similar to the electrode 11 and the first solid electrolyte membrane 12 of the membrane electrode assembly 10 according to Embodiment 1, detailed description thereof is omitted.

The second solid electrolyte membrane 13 contains a sixth compound having a composition represented by one of $BaZr_{1-x6}M^6_{x6}O_3$, $BaCe_{1-x7}M^7_{x7}O_3$, and $BaZr_{1i-x8-y8}Ce_{x8}M^8_{y8}O_3$ ($M^6$, $M^7$, and $M^8$ each represent an element selected from La, Pr, Nd, Pm, Sm, Eu, Gd, Tb, Dy, Ho, Er, Tm, Yb, Y, Sc, Mn, Fe, Co, Ni, Al, Ga, In, and Lu, and $0<x_6<1$, $0<x_7<1$, $0<x_8<1$, and $0<y_8<1$ hold).

Between the second solid electrolyte membrane 13 and the electrode 11, the first solid electrolyte membrane 12 is provided. Hence, even if the second solid electrolyte membrane 13 is formed of a composition which reacts with Ni contained in the electrode 11 and generates a compound to be decomposed by a reaction with $CO_2$, the reaction with Ni can be prevented by the first solid electrolyte membrane 12. Hence, the durability of the second solid electrolyte membrane 13 can be improved, and furthermore, the range of selection of the composition of the second solid electrolyte membrane 13 can be increased. For example, by selecting a material having an electrical conductivity higher than that of the first solid electrolyte membrane 12 as the second solid electrolyte membrane 13, a solid electrolyte membrane of the membrane electrode assembly 20 can be formed.

In addition, at least one of the first solid electrolyte membrane 12 and the second solid electrolyte membrane 13 is required to have a gas-tight structure.

In addition, when an electrochemical device including the membrane electrode assembly 20 is used, for example, as a solid oxide fuel cell, in the laminate of the electrode 11, the first solid electrolyte membrane 12, and the second solid electrolyte membrane 13, power generation is performed by supplying a hydrogen-containing gas and an oxidant gas to the electrode 11 side and the second solid electrolyte membrane 13 side, respectively.

Embodiment 2

Figure 3:
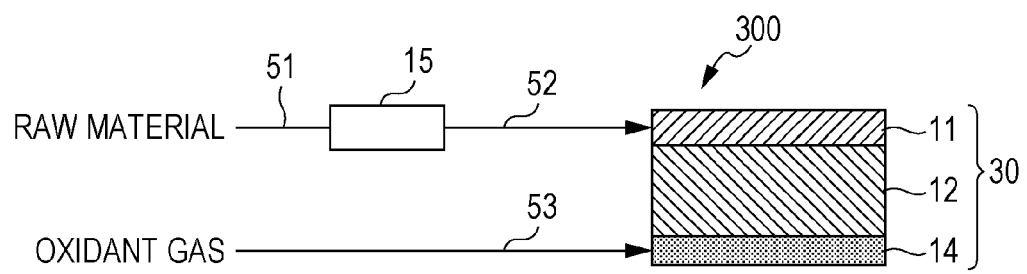
FIG. 3 is a schematic view showing one example of the structure of a fuel cell according to Embodiment 2 of the present disclosure.

Next, the case in which the electrochemical device according to Embodiment 1 is a fuel cell 300 will be described with reference to FIG. 3. FIG. 3 is a schematic view showing one example of the structure of the fuel cell 300 according to Embodiment 2 of the present disclosure. As the fuel cell 300, a solid oxide fuel cell including a proton conductive solid electrolyte membrane may be mentioned by way of example.

As shown in FIG. 3, the fuel cell 300 includes a membrane electrode assembly 30 formed of an electrode 11 functioning as an anode, a first solid electrolyte membrane 12, and a cathode 14; a reformer 15; a raw material supply path 51, an anode gas path 52, and a cathode gas path 53.

The membrane electrode assembly 30 is formed so that as shown in FIG. 3, in the structure of the membrane electrode assembly 10 according to Embodiment 1, the cathode 14 is further included. Since the membrane electrode assembly 30 has a structure similar to that of the membrane electrode assembly 10 according to Embodiment 1 except for the cathode 14, detailed description of the electrode 11 and the first solid electrolyte membrane 12 is omitted.

That is, in the membrane electrode assembly 30, the first solid electrolyte membrane 12 is in contact at one side surface thereof with the electrode 11 and is in contact with the cathode 14 at the other side surface opposite to the one side surface described above, and the electrode 11, the first solid electrolyte membrane 12, and the cathode 14 are laminated to each other in this order. In addition, in the fuel cell 300, the electrode 11 functions as an anode.

A raw material supplied from the outside through the raw material supply path 51 is supplied to the reformer 15. The reformer 15 reforms a supplied raw material and generates a hydrogen-containing gas. The hydrogen-containing gas generated by the reformer 15 is supplied to the electrode 11 functioning as the anode of the membrane electrode assembly 30 through the anode gas path 52. In addition, an oxidant gas supplied from the outside is supplied to the cathode 14 through the cathode gas path 53. In the membrane electrode assembly 30, power generation is performed by an electrochemical reaction between hydrogen in the supplied hydrogen-containing gas and oxygen in the oxidant gas.

In addition, $CO_2$ may be contained in some cases in a hydrogen-containing gas to be supplied to the electrode 11 through the anode gas path 52. For example, when the raw material is a gas containing a hydrocarbon, such as a city gas, by a reforming reaction performed by the reformer 15, $CO_2$ is generated. However, as described above, the electrode 11 is formed of Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_{3-\alpha}$ ($0<x_2<0.3$ holds). Hence, the generation of a compound, such as $BaNiM^1_2O_5$ and/or $BaNiTm_2O_5$, to be decomposed by a reaction with $CO_2$ can be suppressed when the electrode 11 is synthesized.

Furthermore, the electrode 11 may be formed so that the third compound is not contained. When the electrode 11 contains no third compound, the generation of a compound, such as $BaNiM^3_2O_5$, to be decomposed by a reaction with $CO_2$, which is caused by a reaction with Ni contained in the electrode 11, can be suppressed.

As described above, even when $CO_2$ is contained in a hydrogen-containing gas passing through the electrode 11 side, the generation of the compound to be decomposed by a reaction with $CO_2$ can be suppressed when the anode is synthesized.

In addition, the first solid electrolyte membrane 12 includes the electrolyte material containing as the primary component, at least one of the fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and the fifth compound having a composition represented by $BaZr_{1-x5}Tm_{x5}O_3$ ($0<x_5<0.3$ holds). Hence, in the first solid electrolyte membrane 12, the generation of a compound, such as $BaNiM^4_2O_5$ and/or $BaNiTm_2O_5$, to be decomposed by a reaction with $CO_2$, which is caused by a reaction with Ni contained in the adjacent electrode 11, can be suppressed.

Furthermore, the first solid electrolyte membrane 12 may be formed so that the third compound is not contained. When the first solid electrolyte membrane 12 contains no third compound, the generation of a compound, such as $BaNiM^3_2O_5$, to be decomposed by a reaction with $CO_2$, which is caused by a reaction with Ni contained in the adjacent electrode 11, can be suppressed. As described above, even when $CO_2$ is contained in a hydrogen-containing gas passing through the electrode 11 side, the compound to be decomposed by a reaction with $CO_2$ can be suppressed from being generated in the first solid electrolyte membrane 12.

In addition, the fuel cell 300 described above includes the reformer 15 and is formed so that a hydrogen-containing gas generated by the reformer 15 is supplied to the electrode 11. However, the fuel cell 300 is not limited to the structure described above and may be formed so that a hydrogen-containing gas is supplied to the electrode 11 from the outside. When being formed as described above, the fuel cell 300 is not always required to have the reformer 15. In addition, even when $CO_2$ is contained in a hydrogen-containing gas supplied from the outside, since the generation of the compound to be decomposed by a reaction with $CO_2$ can be suppressed, the membrane electrode assembly 30 of the fuel cell 300 having a high durability can be provided.

Modified Example of Embodiment 2

Figure 4:
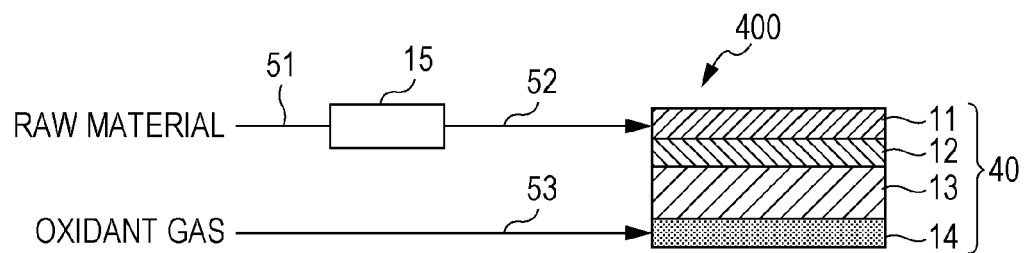
FIG. 4 is a schematic view showing one example of the structure of a fuel cell according to a modified example of Embodiment 2 of the present disclosure.

Next, the case in which an electrochemical device according to a modified example of Embodiment 2 is a fuel cell 400 will be described with reference to FIG. 4. FIG. 4 is schematic view showing one example of the structure of the fuel cell 400 according to the modified example of Embodiment 2 of the present disclosure. As the fuel cell 400, a solid oxide fuel cell including a proton conductive solid electrolyte membrane may be mentioned by way of example.

As shown in FIG. 4, the fuel cell 400 according to the modified example of Embodiment 2 includes a membrane electrode assembly 40 formed of an electrode 11, a first solid electrolyte membrane 12, a second solid electrolyte membrane 13, and a cathode 14, a reformer 15, a raw material supply path 51, an anode gas path 52, and a cathode gas path 53.

The membrane electrode assembly 40 according to the modified example of Embodiment 2 is formed so that as shown in FIG. 4, in the structure of the membrane electrode assembly 20 according to the modified example of Embodiment 1, the cathode 14 is further included. In other words, the membrane electrode assembly 40 according to the modified example of Embodiment 2 is formed so that in the structure of the membrane electrode assembly 30 of the fuel cell 300 according to Embodiment 2, the second solid electrolyte membrane 13 is further included. Hence, detailed description of the electrode 11, the first solid electrolyte membrane 12, the second solid electrolyte membrane 13, and the cathode 14 is omitted.

That is, in the membrane electrode assembly 40, the first solid electrolyte membrane 12 is in contact at one side surface thereof with the electrode 11 and is in contact with the second solid electrolyte membrane 13 at the other side surface opposite to the one side surface described above. In addition, the second solid electrolyte membrane 13 is in contact at one side surface thereof with the first solid electrolyte membrane 12 and is in contact with the cathode 14 at the other side surface opposite to the one side surface described above. In addition, the electrode 11, the first solid electrolyte membrane 12, the second solid electrolyte membrane 13, and the cathode 14 are laminated to each other in this order. In addition, in the fuel cell 400, the electrode 11 functions as an anode.

A raw material supplied from the outside is supplied to the reformer 15 through the raw material supply path 51. The reformer 15 reforms a supplied raw material and generates a hydrogen-containing gas. The hydrogen-containing gas generated by the reformer 15 is supplied to the electrode 11 functioning as the anode of the membrane electrode assembly 40 through the anode gas path 52. In addition, an oxidant gas supplied from the outside is supplied to the cathode 14 through the cathode gas path 53. In the membrane electrode assembly 40, by an electrochemical reaction between hydrogen contained in the supplied hydrogen-containing gas and oxygen contained in the oxidant gas, power generation is performed.

As described above, the electrode 11 is formed of Ni and the electrolyte material containing as the primary component, at least one of the first compound and the second compound. Hence, when the electrode 11 is synthesized, $BaNiM^1_2O_5$ and/or $BaNiTm_2O_5$ can be suppressed from being generated. Furthermore, the electrode 11 may be formed so that the third compound is not contained. When the electrode 11 contains no third compound, the generation of a compound, such as $BaNiM^3_2O_5$, to be decomposed by a reaction with $CO_2$, which is caused by a reaction with Ni contained in the electrode 11, can be suppressed.

Hence, for example, the compound to be decomposed by a reaction with $CO_2$ contained in a hydrogen-containing gas can be suppressed from being generated when the electrode 11 is synthesized.

In addition, the first solid electrolyte membrane 12 includes the electrolyte material containing as the primary component, at least one of the fourth compound and the fifth compound. Hence, the first solid electrolyte membrane 12 can suppress the generation of $BaNiM^4_2O_5$ and/or $BaNiTm_2O_5$, which is caused by a reaction with Ni contained in the adjacent electrode 11. Furthermore, the first solid electrolyte membrane 12 may be formed so that the third compound is not contained. When the first solid electrolyte membrane 12 contains no third compound, the generation of a compound, such as $BaNiM^3_2O_5$, to be decomposed by a reaction with $CO_2$, which is caused by a reaction with Ni contained in the adjacent electrode 11, can be suppressed. As described above, the first solid electrolyte membrane 12 can suppress the generation of the compound to be decomposed by a reaction with $CO_2$ contained in a hydrogen-containing gas, which is caused by a reaction with Ni contained in the adjacent electrode 11.

In addition, between the second solid electrolyte membrane 13 and the electrode 11, the first solid electrolyte membrane 12 is provided. Hence, even when the second solid electrolyte membrane 13 is formed of a composition which reacts with Ni contained in the electrode 11 and generates a compound to be decomposed by a reaction with $CO_2$, the reaction with Ni can be prevented by the first solid electrolyte membrane 12. Accordingly, the durability of the second solid electrolyte membrane 13 can be improved. Furthermore, the range of selection of the composition of the second solid electrolyte membrane 13 can be increased. For example, by selecting a material having an electrical conductivity higher than that of the first solid electrolyte membrane 12 as the second solid electrolyte membrane 13, a solid electrolyte membrane of the membrane electrode assembly 40 can be formed.

In addition, the fuel cell 400 includes the reformer 15 and is formed so that a hydrogen-containing gas generated by the reformer 15 is supplied to the electrode 11. However, the fuel cell 400 is not limited to the structure described above and may be formed so that a hydrogen-containing gas is supplied to the electrode 11 from the outside. When being formed as described above, the fuel cell 400 is not always required to include the reformer 15. In addition, even when $CO_2$ is contained in a hydrogen-containing gas supplied from the outside, since the compound to be decomposed by a reaction with $CO_2$ can be suppressed from being generated, the membrane electrode assembly 40 of the fuel cell 400 having a high durability can be provided.

Embodiment 3

Figure 5:
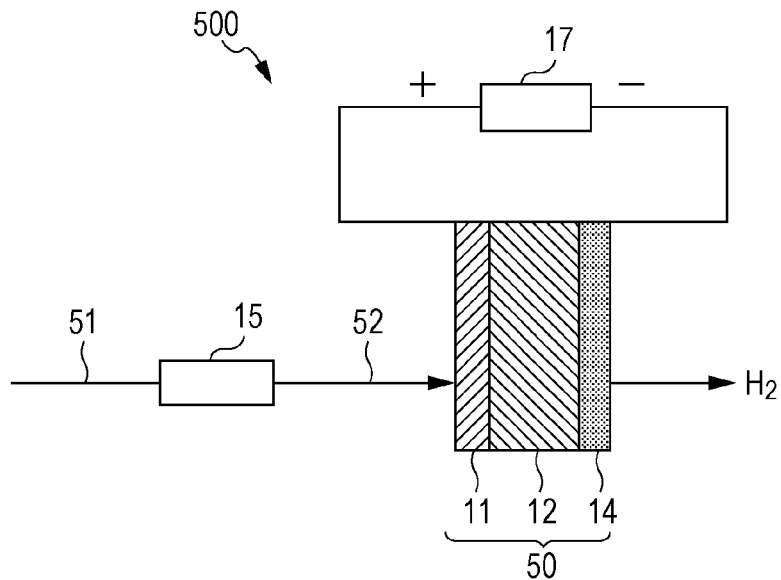
FIG. 5 is a schematic view showing one example of the structure of an electrochemical hydrogen pump according to Embodiment 3 of the present disclosure.

Next, the case in which the electrochemical device according to Embodiment 1 is an electrochemical hydrogen pump 500 will be described with reference to FIG. 5. FIG. 5 is a schematic view showing one example of the structure of the electrochemical hydrogen pump 500 according to Embodiment 3 of the present disclosure.

As shown in FIG. 5, the electrochemical hydrogen pump 500 includes a membrane electrode assembly 50 formed of an electrode 11, a first solid electrolyte membrane 12, and a cathode 14, a reformer 15, a raw material supply path 51, and an anode gas path 52 and is formed so that the voltage is applied to the electrode 11 and the cathode 14 of the membrane electrode assembly 50 from an exterior power source 17.

The membrane electrode assembly 50 is formed so that, as shown in FIG. 5, in the membrane electrode assembly 10 according to Embodiment 1, the cathode 14 is further included. Since the membrane electrode assembly 50 has the structure similar to that of the membrane electrode assembly 10 according to Embodiment 1 except that the cathode 14 is further included, detailed description of the electrode 11 and the first solid electrolyte membrane 12 is omitted.

That is, in the membrane electrode assembly 50, the first solid electrolyte membrane 12 is in contact at one side surface thereof with the electrode 11 and is in contact with the cathode 14 at the other side surface opposite to the one side surface described above, and the electrode 11, the first solid electrolyte membrane 12, and the cathode 14 are laminated to each other in this order. In addition, in the electrochemical hydrogen pump 500, the electrode 11 functions as an anode.

A raw material supplied from the outside is supplied to the reformer 15 through the raw material supply path 51. The reformer 15 reforms a supplied raw material and generates a hydrogen-containing gas. The hydrogen-containing gas generated by the reformer 15 is supplied to the electrode 11 functioning as the anode of the membrane electrode assembly 50 through the anode gas path 52. In the membrane electrode assembly 50, when a current is allowed to flow to the electrode 11 and the cathode 14 from the exterior power source, hydrogen of the hydrogen-containing gas only moves in the form of a proton from the electrode 11 (anode) side to the cathode 14 side through the first solid electrolyte membrane 12. The amount of hydrogen to be transported is proportional to a current which is allowed to flow in accordance with Faraday's law. As described above, the electrochemical hydrogen pump 500 can electrochemically pump up hydrogen.

In addition, $CO_2$ may be contained in some cases in a hydrogen-containing gas to be supplied to the electrode 11 through the anode gas path 52. For example, when the raw material is a gas containing a hydrocarbon, such as a city gas, by a reforming reaction performed by the reformer 15, $CO_2$ is generated. However, as described above, the electrode 11 includes Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_3$ ($0<x_2<0.3$ holds). As a result, the generation of $BaNiM^1_2O_5$ and/or $BaNiTm_2O_5$ can be suppressed when the electrode 11 is synthesized.

Furthermore, the electrode 11 may be formed so that the third compound having a composition represented by $BaZr_{1-x3}M^3_{x3}O_3$ ($M^3$ represents at least one element selected from Er, Y, Ho, Dy, and Gd, and $0<x_3<1$ holds) is not contained. When the electrode 11 contains no third compound, the generation of a compound, such as $BaNiM^3_2O_5$, to be decomposed by a reaction with $CO_2$, which is caused by a reaction with Ni contained in the electrode 11, can be suppressed when the electrode 11 is synthesized.

Hence, when being synthesized, the electrode 11 of the membrane electrode assembly 50 of the electrochemical hydrogen pump 500 can suppress the generation of the compound to be decomposed by a reaction with $CO_2$. As a result, the durability of the electrode 11 of the electrochemical hydrogen pump 500 can be improved.

In addition, the first solid electrolyte membrane 12 of the membrane electrode assembly 50 is a proton conductive solid electrolyte membrane and includes the electrolyte material containing as the primary component, at least one of the fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and the fifth compound having a composition represented by $BaZr_{1-x5}Tm_{x5}O_3$ ($0<x_5<0.3$ holds). Hence, in the first solid electrolyte membrane 12, the generation of a compound, such as $BaNiM^4_2O_5$ and/or $BaNiTm_2O_5$, to be decomposed by a reaction with $CO_2$, which is caused by a reaction with Ni contained in the electrode 11 in contact with the first solid electrolyte membrane 12, can be suppressed.

Furthermore, the first solid electrolyte membrane 12 may be formed so that the third compound described above is not contained. When the first solid electrolyte membrane 12 contains no third compound, the generation of a compound, such as $BaNiM^3_2O_5$, to be decomposed by a reaction with $CO_2$, which is caused by a reaction with Ni contained in the electrode 11, can be suppressed.

As described above, the membrane electrode assembly 50 can suppress the generation of the compound to be decomposed by a reaction with $CO_2$, which is caused by a reaction with Ni, when the electrode 11 is synthesized. Furthermore, in the first solid electrolyte membrane 12, the generation of the compound to be decomposed by a reaction with $CO_2$, which is caused by a reaction with Ni contained in the adjacent electrode 11, can be suppressed. Hence, the durability of the electrode 11 and the first solid electrolyte membrane 12 of the membrane electrode assembly 50 of the electrochemical hydrogen pump 500 can be improved.

In addition, the electrochemical hydrogen pump 500 includes the reformer 15 and is formed so that a hydrogen-containing gas generated by the reformer 15 is supplied to the electrode 11. However, the electrochemical hydrogen pump 500 is not limited to the structure described above and may be formed so that a hydrogen-containing gas is supplied to the electrode 11 from the outside. When being formed as described above, the electrochemical hydrogen pump 500 may not be always required to include the reformer 15. In addition, even when $CO_2$ is contained in a hydrogen-containing gas supplied from the outside, since the generation of the compound to be decomposed by a reaction with $CO_2$ can be suppressed, the membrane electrode assembly 50 of the electrochemical hydrogen pump 500 having a high durability can be provided.

Modified Example of Embodiment 3

Figure 6:
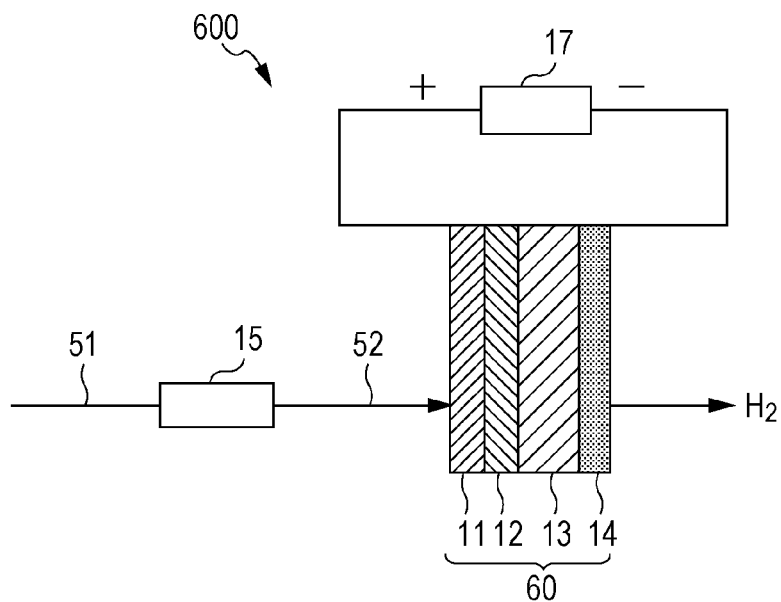
FIG. 6 is a schematic view showing one example of the structure of an electrochemical hydrogen pump according to a modified example of Embodiment 3 of the present disclosure.

Next, the case in that the electrochemical device according to the modified example of Embodiment 1 is an electrochemical hydrogen pump 600 will be described with reference to FIG. 6. FIG. 6 is a schematic view showing one example of the structure of the electrochemical hydrogen pump 600 according to a modified example of Embodiment 3 of the present disclosure.

As shown in FIG. 6, the electrochemical hydrogen pump 600 according to the modified example of Embodiment 3 includes a membrane electrode assembly 60 formed of an electrode 11, a first solid electrolyte membrane 12, a second solid electrolyte membrane 13, and a cathode 14, a reformer 15, a raw material supply path 51, and an anode gas path 52. In addition, the membrane electrode assembly 60 is formed so that the voltage is applied to the electrode 11 and the cathode 14 from an exterior power source 17.

The membrane electrode assembly 60 is formed so that as shown in FIG. 6, in the membrane electrode assembly 20 according to the modified example of Embodiment 1, the cathode 14 is further included. In other words, the membrane electrode assembly 60 is formed so that in the membrane electrode assembly 50 of the electrochemical hydrogen pump 500 according to Embodiment 3, the second solid electrolyte membrane 13 is further included. Hence, detailed description of the electrode 11, the first solid electrolyte membrane 12, the second solid electrolyte membrane 13, and the cathode 14 is omitted.

That is, in the membrane electrode assembly 60, the first solid electrolyte membrane 12 is in contact at one side surface thereof with the electrode 11 and is in contact with the second solid electrolyte membrane 13 at the other side surface opposite to the one side surface described above. In addition, the second solid electrolyte membrane 13 is in contact at one side surface thereof with the first solid electrolyte membrane 12 and is in contact with the cathode 14 at the other side surface opposite to the one side surface described above. In addition, the electrode 11, the first solid electrolyte membrane 12, the second solid electrolyte membrane 13, and the cathode 14 are laminated to each other in this order. In addition, in the electrochemical hydrogen pump 600, the electrode 11 functions as an anode.

A raw material supplied from the outside is supplied to the reformer 15 through the raw material supply path 51. The reformer 15 reforms a supplied raw material by a reforming reaction and generates a hydrogen-containing gas. The hydrogen-containing gas generated by the reformer 15 is supplied to the electrode 11 functioning as the anode of the membrane electrode assembly 60 through the anode gas path 52. In the membrane electrode assembly 60, when a current is allowed to flow from the exterior power source to the electrode 11 and the cathode 14, hydrogen of the hydrogen-containing gas only moves in the form of a proton from the electrode 11 (anode) side to the cathode 14 side through the first solid electrolyte membrane 12 and the second solid electrolyte membrane 13. The amount of hydrogen to be transported is proportional to a current which is allowed to flow in accordance with Faraday's law. As described above, the electrochemical hydrogen pump 600 can electrochemically pump up hydrogen.

In addition, $CO_2$ may be contained in some cases in a hydrogen-containing gas supplied to the electrode 11 through the anode gas path 52. For example, when the raw material is a gas containing a hydrocarbon, such as a city gas, $CO_2$ is generated by a reforming reaction performed in the reformer 15. However, as described above, the electrode 11 includes Ni and the electrolyte material containing as the primary component, at least one of the first compound and the second compound. Hence, the generation of a compound, such as $BaNiM^1{}_2O_5$ and/or $BaNiTm_2O_5$, to be decomposed by a reaction with $CO_2$, which is caused by a reaction with Ni, can be suppressed when the electrode 11 is synthesized. Furthermore, the electrode 11 may be formed so that the third compound is not contained. When the electrode 11 contains no third compound, the generation of a compound, such as $BaNiM^3{}_2O_5$, to be decomposed by a reaction with $CO_2$, which is caused by a reaction with Ni, can be suppressed when the electrode 11 is synthesized. Accordingly, for example, the generation of the compound to be decomposed by a reaction with $CO_2$ contained in a hydrogen-containing gas can be suppressed when the electrode 11 is synthesized.

In addition, the first solid electrolyte membrane 12 is formed to include the electrolyte material containing as the primary component, at least one of the fourth compound and the fifth compound. Hence, the first solid electrolyte membrane 12 can suppress the generation of a compound, such as $BaNiM^4{}_2O_5$ and/or $BaNiTm_2O_5$, to be decomposed by a reaction with $CO_2$, which is caused by a reaction with Ni contained in the adjacent electrode 11. Furthermore, the first solid electrolyte membrane 12 may be formed so that the third compound is not contained. When the first solid electrolyte membrane 12 contains no third compound, the generation of a compound, such as $BaNiM^3{}_2O_5$, to be decomposed by a reaction with $CO_2$, which is caused by a reaction with Ni contained in the adjacent electrode 11, can be suppressed. As described above, the first solid electrolyte membrane 12 can suppress, for example, the generation of the compound to be decomposed by a reaction with $CO_2$ contained in a hydrogen-containing gas, which is caused by a reaction with Ni contained in the adjacent electrode 11.

In addition, between the second solid electrolyte membrane 13 and the electrode 11, the first solid electrolyte membrane 12 is provided. Hence, even when the second solid electrolyte membrane 13 is formed of a composition which reacts with Ni contained in the electrode 11 and generates a compound to be decomposed by a reaction with $CO_2$, the reaction with Ni can be prevented by the first solid electrolyte membrane 12. Accordingly, the durability of the second solid electrolyte membrane 13 can be improved, and the range of selection of the composition of the second solid electrolyte membrane 13 can be increased. For example, by selecting a material having an electrical conductivity higher than that of the first solid electrolyte membrane 12 as the second solid electrolyte membrane 13, a solid electrolyte membrane of the membrane electrode assembly 60 can be formed.

In addition, the electrochemical hydrogen pump 600 includes the reformer 15 and is formed so that a hydrogen-containing gas generated by the reformer 15 is supplied to the electrode 11. However, the electrochemical hydrogen pump 600 is not limited to the structure described above and may be formed so that a hydrogen-containing gas is supplied to the electrode 11 from the outside. When being formed as described above, the electrochemical hydrogen pump 600 is not always required to include the reformer 15. In addition, even when $CO_2$ is contained in a hydrogen-containing gas supplied from the outside, since the generation of the compound to be decomposed by a reaction with $CO_2$ can be suppressed, the membrane electrode assembly 60 of the electrochemical hydrogen pump 600 having a high durability can be provided.

Embodiment 4

Figure 7:
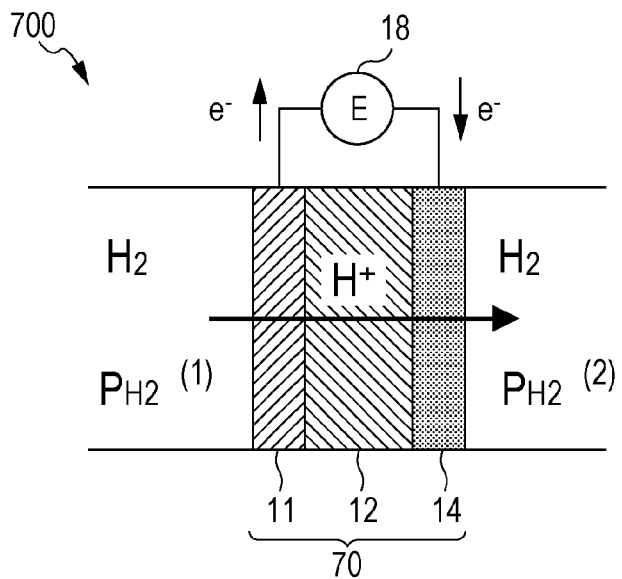
FIG. 7 is a schematic view showing one example of the structure of a hydrogen sensor according to Embodiment 4 of the present disclosure.

Next, the case in which the electrochemical device according to Embodiment 1 is a hydrogen sensor 700 will be described with reference to FIG. 7. FIG. 7 is a schematic view showing one example of the structure of the hydrogen sensor 700 according to Embodiment 4 of the present disclosure.

As shown in FIG. 7, the hydrogen sensor 700 according to Embodiment 4 includes a membrane electrode assembly 70 formed of an electrode 11, a first solid electrolyte membrane 12, and a cathode 14. In addition, the electrode 11 and the cathode 14 of the membrane electrode assembly 70 are connected to a voltmeter 18 so that the voltage can be measured.

The membrane electrode assembly 70 is formed so that as shown in FIG. 7, in the membrane electrode assembly 10 according to Embodiment 1, the cathode 14 is further included. Since the membrane electrode assembly 70 has a structure similar to that of the membrane electrode assembly 10 according to Embodiment 1 except that the cathode 14 is further included, detailed description of the electrode 11 and the first solid electrolyte membrane 12 is omitted.

That is, in the membrane electrode assembly 70, the first solid electrolyte membrane 12 is in contact at one side surface thereof with the electrode 11 and is in contact with the cathode 14 at the other side surface opposite to the one side surface described above, and the electrode 11, the first solid electrolyte membrane 12, and the cathode 14 are laminated to each other in this order. In addition, in the hydrogen sensor 700, the electrode 11 functions as an anode.

When gases having different hydrogen gas partial pressures are present at two sides separated by the membrane electrode assembly 70 interposed therebetween, an electromotive force is generated using a gas $P_{H2}$ (1) at a high hydrogen partial pressure side as a negative electrode and a gas $P_{H2}$ (2) at a low hydrogen partial pressure side as a positive electrode. When the temperature at which the electromotive force is generated and the hydrogen partial pressure at one side are constant, the hydrogen partial pressure at the other side can be obtained by calculation. In this case, in the membrane electrode assembly 70, when a current is allowed to flow from an exterior power source to the electrode 11 and the cathode 14, hydrogen of a hydrogen-containing gas only moves in the form of a proton from the electrode 11 (anode) side to the cathode 14 side through the first solid electrolyte membrane 12. As described above, the hydrogen sensor 700 can measure the hydrogen partial pressure in the gas from the difference in hydrogen partial pressure.

Incidentally, hydrogen-containing gases which generate an electromotive force with the membrane electrode assembly 70 interposed therebetween may contain $CO_2$ in some cases. However, as described above, the electrode 11 includes Ni and the electrolyte material containing as the primary component, at least one of the first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and the second compound having a composition represented by $BaZr_{1-x2}Tm_{x2}O_3$ ($0<x_2<0.3$ holds). Hence, the generation of a compound, such as $BaNiM^1_2O_5$ and/or $BaNiTm_2O_5$, to be decomposed by a reaction with $CO_2$, which is caused by a reaction with Ni, can be suppressed when the electrode 11 is synthesized.

Furthermore, the electrode 11 may be formed so that the third compound having a composition represented by $BaZr_{1-x3}M^3_{x3}O_3$ ($M^3$ represents at least one element selected from Er, Y, Ho, Dy, and Gd, and $0<x_3<1$ holds) is not contained. When the electrode 11 contains no third compound, the generation of a compound, such as $BaNiM^3_2O_5$, to be decomposed by a reaction with $CO_2$, which is caused by a reaction with Ni, can be suppressed when the electrode 11 is synthesized.

Hence, the electrode 11 of the membrane electrode assembly 70 of the hydrogen sensor 700 can suppress the generation of the compound to be decomposed by a reaction with $CO_2$ when the electrode 11 is synthesized. Accordingly, the durability of the electrode 11 of the hydrogen sensor 700 can be improved.

In addition, the first solid electrolyte membrane 12 of the membrane electrode assembly 70 is a proton conductive solid electrolyte membrane and includes the electrolyte material containing as the primary component, at least one of the fourth compound having a composition represented by $BaZr_{1-x4}M^4_{x4}O_3$ ($M^4$ represents at least one element selected from trivalent elements each having an ion radius of more than 0.720 A° to less than 0.880 A°, and $0<x_4<1$ holds) and the fifth compound having a composition represented by $BaZr_{1-x5}Tm_{x5}O_3$ ($0<x_5<0.3$ holds). Hence, in the first solid electrolyte membrane 12, the generation of a compound, such as $BaNiM^4_2O_5$ and/or $BaNiTm_2O_5$, to be decomposed by a reaction with $CO_2$, which is caused by a reaction with Ni contained in the electrode 11 in contact with the first solid electrolyte membrane 12, can be suppressed. Furthermore, the first solid electrolyte membrane 12 may be formed so that the third compound is not contained. When the first solid electrolyte membrane 12 contains no third compound, the generation of a compound, such as $BaNiM^3_2O_5$, to be decomposed by a reaction with $CO_2$, which is caused by a reaction with Ni contained in the adjacent electrode 11, can be suppressed.

As described above, the membrane electrode assembly 70 can suppress the generation of the compound to be decomposed by a reaction with $CO_2$, which is caused by a reaction with Ni, can be suppressed when the electrode 11 is synthesized. Furthermore, in the first solid electrolyte membrane 12, the generation of the compound to be decomposed by a reaction with $CO_2$, which is caused by a reaction with Ni contained in the adjacent electrode 11, can be suppressed. Hence, the durability of the electrode 11 and the first solid electrolyte membrane 12 of the membrane electrode assembly 70 of the hydrogen sensor 700 can be improved.

Modified Example of Embodiment 4

Figure 8:
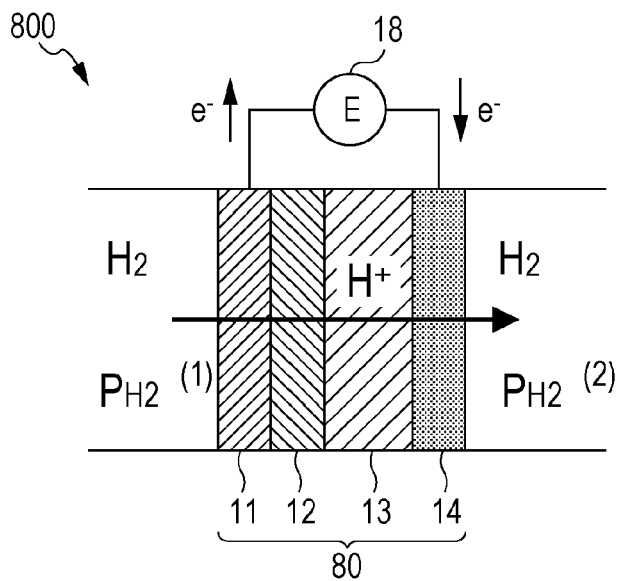
FIG. 8 is a schematic view showing one example of a hydrogen sensor according to a modified example of Embodiment 4 of the present disclosure.

Next, the case in which the electrochemical device according to the modified example of Embodiment 1 is a hydrogen sensor 800 will be described with reference to FIG. 8. FIG. 8 is a schematic view showing one example of the structure of the hydrogen sensor 800 according to a modified example of Embodiment 4.

As shown in FIG. 8, the hydrogen sensor 800 according to the modified example of Embodiment 4 includes a membrane electrode assembly 80 formed of an electrode 11, a first solid electrolyte membrane 12, a second solid electrolyte membrane 13, and a cathode 14. In addition, the electrode 11 and the cathode 14 of the membrane electrode assembly 80 are connected to a voltmeter 18 so that the voltage can be measured.

The membrane electrode assembly 80 is formed so that as shown in FIG. 8, in the membrane electrode assembly 20 according to the modified example of Embodiment 1, the cathode 14 is further included. In other words, the membrane electrode assembly 80 has a structure similar to that of the membrane electrode assembly 70 of the hydrogen sensor 700 according to Embodiment 4 except that the second solid electrolyte membrane 13 is further included. Hence, detailed description of the electrode 11, the first solid electrolyte membrane 12, the second solid electrolyte membrane 13, and the cathode 14 is omitted.

That is, in the membrane electrode assembly 80, the first solid electrolyte membrane 12 is in contact at one side surface thereof with the electrode 11 and is in contact with the second solid electrolyte membrane 13 at the other side surface opposite to the one side surface described above. In addition, the second solid electrolyte membrane 13 is in contact at one side surface thereof with the first solid electrolyte membrane 12 and is in contact with the cathode 14 at the other side surface opposite to the one side surface described above. In addition, the electrode 11, the first solid electrolyte membrane 12, the second solid electrolyte membrane 13, and the cathode 14 are laminated to each other in this order. In addition, in the hydrogen sensor 800, the electrode 11 functions as an anode.

When gases having different hydrogen gas partial pressures are present at two sides separated by the membrane electrode assembly 80 interposed therebetween, an electromotive force is generated using a gas $P_{H2}$ (1) at a high hydrogen partial pressure side as a negative electrode and a gas $P_{H2}$ (2) at a low hydrogen partial pressure side as a positive electrode. When the temperature at which the electromotive force is generated and the hydrogen partial pressure at one side are constant, the hydrogen partial pressure at the other side can be obtained by calculation. In this case, in the membrane electrode assembly 80, when a current is allowed to flow from an exterior power source to the electrode 11 and the cathode 14, hydrogen of a hydrogen-containing gas only moves in the form of a proton from the electrode 11 (anode) side to the cathode 14 side through the first solid electrolyte membrane 12 and the second solid electrolyte membrane 13. As described above, the hydrogen sensor 800 can measure the hydrogen partial pressure in the gas from the difference in hydrogen partial pressure.

Incidentally, hydrogen-containing gases which generate an electromotive force with the membrane electrode assembly 80 interposed therebetween may contain $CO_2$ in some cases. However, as described above, the electrode 11 includes Ni and the electrolyte material containing as the primary component, at least one of the first compound and the second compound. Hence, the generation of a compound, such as $BaNiM^1_2O_5$ and/or $BaNiTm_2O_5$, to be decomposed by a reaction with $CO_2$, which is caused by a reaction with Ni, can be suppressed when the electrode 11 is synthesized. Furthermore, the electrode 11 may be formed so that the third compound is not contained. When the electrode 11 contains no third compound, the generation of a compound, such as $BaNiM^3_2O_5$, to be decomposed by a reaction with $CO_2$, which is caused by a reaction with Ni, can be suppressed when the electrode 11 is synthesized. Hence, for example, the compound to be decomposed by a reaction with $CO_2$ contained in a hydrogen-containing gas can be suppressed from being generated when the electrode 11 is synthesized.

In addition, the first solid electrolyte membrane 12 includes the electrolyte material containing as the primary component, at least one of the fourth compound and the fifth compound. Hence, the first solid electrolyte membrane 12 can suppress the generation of a compound, such as $BaNiM^4_2O_5$ and/or $BaNiTm_2O_5$, to be decomposed by a reaction with $CO_2$, which is caused by a reaction with Ni contained in the adjacent electrode 11. Furthermore, the first solid electrolyte membrane 12 may be formed so that the third compound is not contained. When the first solid electrolyte membrane 12 contains no third compound, the generation of a compound, such as $BaNiM^3_2O_5$, to be decomposed by a reaction with $CO_2$, which is caused by a reaction with Ni contained in the adjacent electrode 11, can be suppressed. As described above, the first solid electrolyte membrane 12 can suppress, for example, the generation of the compound to be decomposed by a reaction with $CO_2$ contained in a hydrogen-containing gas, which is caused by a reaction with Ni contained in the adjacent electrode 11.

In addition, between the second solid electrolyte membrane 13 and the electrode 11, the first solid electrolyte membrane 12 is provided. Hence, even when the second solid electrolyte membrane 13 is formed of a composition which reacts with Ni contained in the electrode 11 and generates a compound to be decomposed by a reaction with $CO_2$, the reaction with Ni can be prevented by the first solid electrolyte membrane 12. Accordingly, the durability of the second solid electrolyte membrane 13 can be improved, and furthermore, the range of selection of the composition of the second solid electrolyte membrane 13 can be increased. For example, by selecting a material having an electrical conductivity higher than that of the first solid electrolyte membrane 12 as the second solid electrolyte membrane 13, a solid electrolyte membrane of the membrane electrode assembly 60 can be formed.

In addition, in Embodiment 2, the modified example of Embodiment 2, Embodiment 3, the modified example of Embodiment 3, Embodiment 4, and the modified example of Embodiment 4 described above, although the cases in which as the electrochemical device, the fuel cells 300 and 400, the electrochemical hydrogen pumps 500 and 600, and the hydrogen sensor 700 and 800 have been described, the electrochemical device is not limited to those described above.

EXAMPLES

Next, as shown in the structures of the membrane electrode assemblies 10, 20, 30, 40, 50, 60, 70, and 80 described in Embodiment 1, the modified example of Embodiment 1, Embodiment 2, the modified example of Embodiment 2, Embodiment 3, the modified example of Embodiment 3, Embodiment 4, and the modified example of Embodiment 4, respectively, the electrode 11 is formed to include Ni and the compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) or $BaZr_{1-x2}Tm_{x2}O_3$ ($0<x_2<0.3$ holds). However, the electrode 11 may be formed so that the third compound having a composition represented by $BaZr_{1-x3}M^3_{x3}O_3$ ($M^3$ represents at least one element selected from Er, Y, Ho, Dy, and Gd, and $0<x_3<1$ holds) is not contained.

As an evaluation method which enables the present inventors to find out that by the formation of the electrode 11 as described above, the generation of $BaNiM^1_2O_5$ can be suppressed when the electrode 11 is synthesized, the following examples will be described. However, the present disclosure is not limited to the following examples.

First, in order to perform this evaluation method, electrodes 11 of Examples 1, 2, 3, 4, 5, 6, and 7 and electrodes 11 of Comparative Examples 1, 2, 3, 4, 5, 6, and 7 were prepared. In addition, since Yb was used as a dopant M, the electrodes 11 of Examples 6 and 7 were each similar to the electrode 11 of Example 3; however, the addition amounts of Yb were different from each other.

[Example 1] An electrode material (sintered body) synthesized by firing a mixed powder of NiO and $BaZr_{0.8}Sc_{0.2}O_{3-\alpha}$

[Example 2] An electrode material (sintered body) synthesized by firing a mixed powder of NiO and $BaZr_{0.8}In_{0.2}O_{3-\alpha}$

[Example 3] An electrode material (sintered body) synthesized by firing a mixed powder of NiO and $BaZr_{0.8}Yb_{0.2}O_{3-\alpha}$

[Example 4] An electrode material (sintered body) synthesized by firing a mixed powder of NiO and $BaZr_{0.8}Lu_{0.2}O_{3-\alpha}$

[Example 5] An electrode material (sintered body) synthesized by firing a mixed powder of NiO and $BaZr_{0.8}Tm_{0.2}O_{3-\alpha}$

[Example 6] An electrode material (sintered body) synthesized by firing a mixed powder of NiO and $BaZr_{0.7}Yb_{0.3}O_{3-\alpha}$

[Example 7] An electrode material (sintered body) synthesized by firing a mixed powder of NiO and $BaZr_{0.4}Yb_{0.6}O_{3-\alpha}$

[Comparative Example 1] An electrode material (sintered body) synthesized by firing a mixed powder of NiO and $BaZr_{0.8}Y_{0.2}O_{3-\alpha}$

[Comparative Example 2] An electrode material (sintered body) synthesized by firing a mixed powder of NiO and $BaZr_{0.7}Tm_{0.3}O_{3-\alpha}$

[Comparative Example 3] An electrode material (sintered body) synthesized by firing a mixed powder of NiO and $BaZr_{0.8}Er_{0.2}O_{3-\alpha}$

[Comparative Example 4] An electrode material (sintered body) synthesized by firing a mixed powder of NiO and $BaZr_{0.8}Ho_{0.2}O_{3-\alpha}$

[Comparative Example 5] An electrode material (sintered body) synthesized by firing a mixed powder of NiO and $BaZr_{0.8}Dy_{0.2}O_{3-\alpha}$

[Comparative Example 6] An electrode material (sintered body) synthesized by firing a mixed powder of NiO and $BaZr_{0.8}Gd_{0.2}O_{3-\alpha}$ (Synthesis Treatment)

Figure 9:
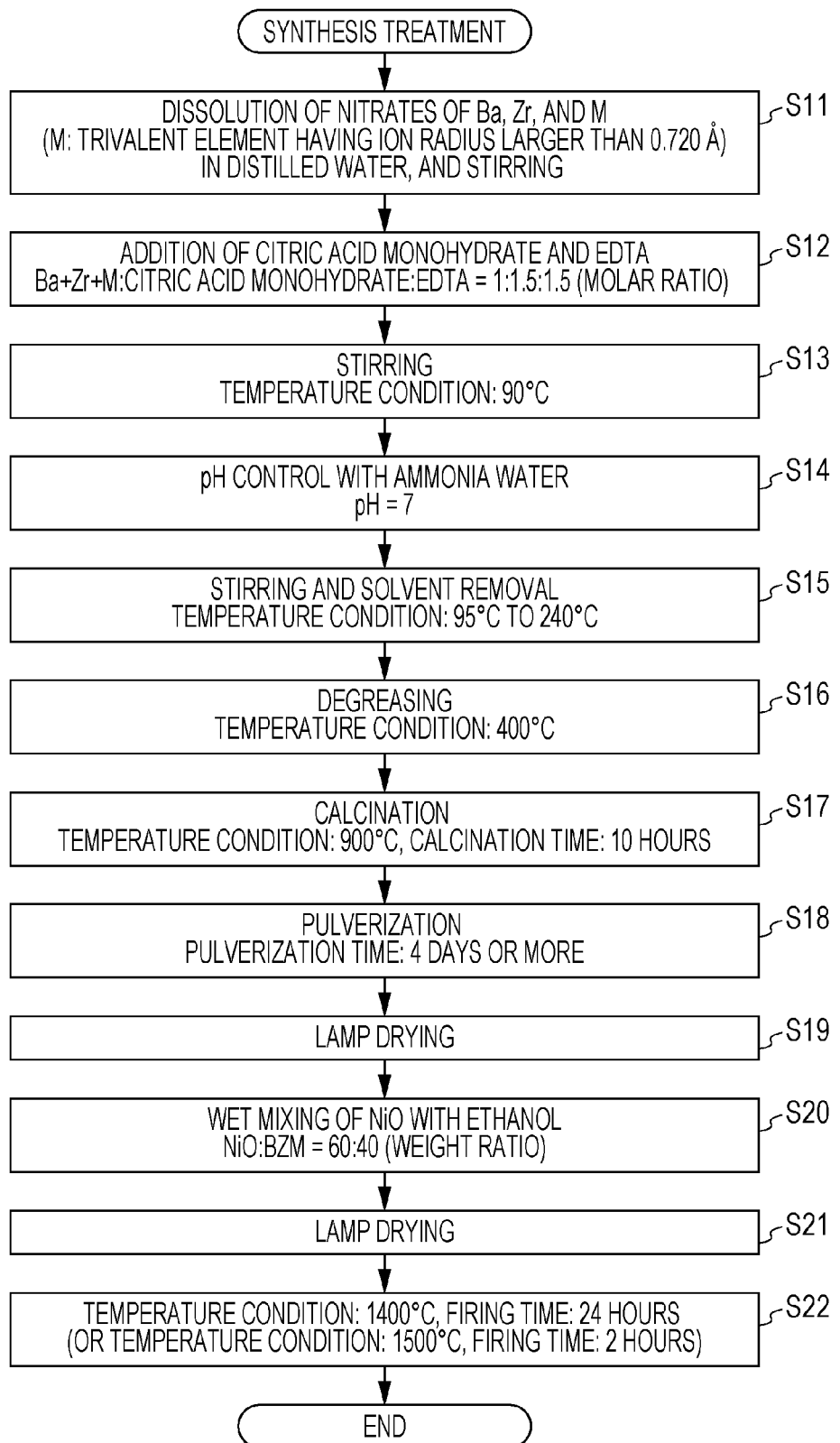
FIG. 9 is a flowchart showing one example of a synthesis treatment of an electrode material forming an electrode according to an example of the present disclosure.

Next, with reference to FIG. 9, a synthesis treatment of an electrode material forming the electrode 11 according to the example (each of Examples 1 to 7 and Comparative Examples 1 to 6) will be described. FIG. 9 is a flowchart showing one example of the synthesis treatment of the electrode material forming the electrode 11 according to the example of the present disclosure.

First, after powders of $M(NO_3)_3 \cdot xH_2O$ (M represents an element selected from Sc, In, Yb, Lu, Tm, Y, Er, Ho, Dy, and Gd, each of which is a trivalent element having an ion radius of more than 0.720)A° (manufactured by Kojundo Chemical Laboratory Co., Ltd.) were each added to $Ba(NO_3)_2$ (manufactured by Kanto Chemical Co., Inc.) and $ZrO(NO_3)_2 \cdot 2H_2O$ (manufactured by Kanto Chemical Co., Inc.), a citric acid complex method was performed, so that starting raw materials of Examples 1 to 7 and Comparative Examples 1 to 6 were prepared. In addition, after being weighed, a predetermined amount of a powder of each of the starting raw materials was dissolved in distilled water and then stirred (Step S11).

Next, to the metal cation, 1.5 equivalents of citric acid monohydrate (manufactured by Kanto Chemical Co., Inc.) and 1.5 equivalents of ethylenediaminetetraacetic acid (EDTA) (manufactured by Kanto Chemical Co., Inc.) were added (Step S12). Subsequently, stirring was performed at 90° C. (Step S13).

Next, pH was controlled at 7 using ammonia water (28%) (manufactured by Kanto Chemical Co., Inc.) (Step S14). After pH was controlled, the solvent was removed at 95° C. to 240° C. using a hot stirrer (Step S15), and an obtained solid material was pulverized using a mortar and was then degreased at approximately 400° C. (Step S16).

After the degreasing was performed, an obtained powder was press-molded into a cylindrical shape and was then calcined at 900° C. for 10 hours (Step S17). After the calcination was performed, a coarsely pulverized powder was charged into a plastic container together with zirconia-made balls, ethanol was added thereto, and pulverization was performed for 4 days or more using a ball mill (Step S18).

After the pulverization was performed using a ball mill, the solvent was removed by lamp drying (Step S19). An obtained powder and NiO (manufactured by Sumitomo Metal Mining Co., Ltd.) were weighed so that the weight ratio of NiO to the obtained powder (BZM) was 60 to 40 and were then wet-mixed with ethanol (Step S20). Subsequently, the solvent was removed by lamp drying (Step S21), and an obtained powder was fired at 1,400° C. for 24 hours, so that a fired powder was obtained. In addition, for the electrode material of each of Examples 4, 5, 6, and 7, the obtained powder was fired at 1,500° C. for 2 hours (Step S22).

By the use of the electrode material (sintered body) of each of Examples 1 to 7 and Comparative Examples 1 to 6 formed by the synthesis treatment described above, the analysis of a reaction product was performed as described below.

(Analysis of Reaction Product)

The product of the electrode material of each of Examples 1 to 7 and Comparative Examples 1 to 6 was analyzed by an x-ray structure diffraction measurement. The x-ray structure diffraction measurement was performed using an x-ray diffraction apparatus manufactured by PANalytical. The results of the x-ray structure diffraction measurement will be described with reference to FIGS. 10 to 17. In addition, in the analysis by the x-ray structure diffraction measurement of each of Examples 1 to 7, the result obtained before the firing is performed at 1,400° C. or 1,500° C. is also shown for reference.

Figure 10:
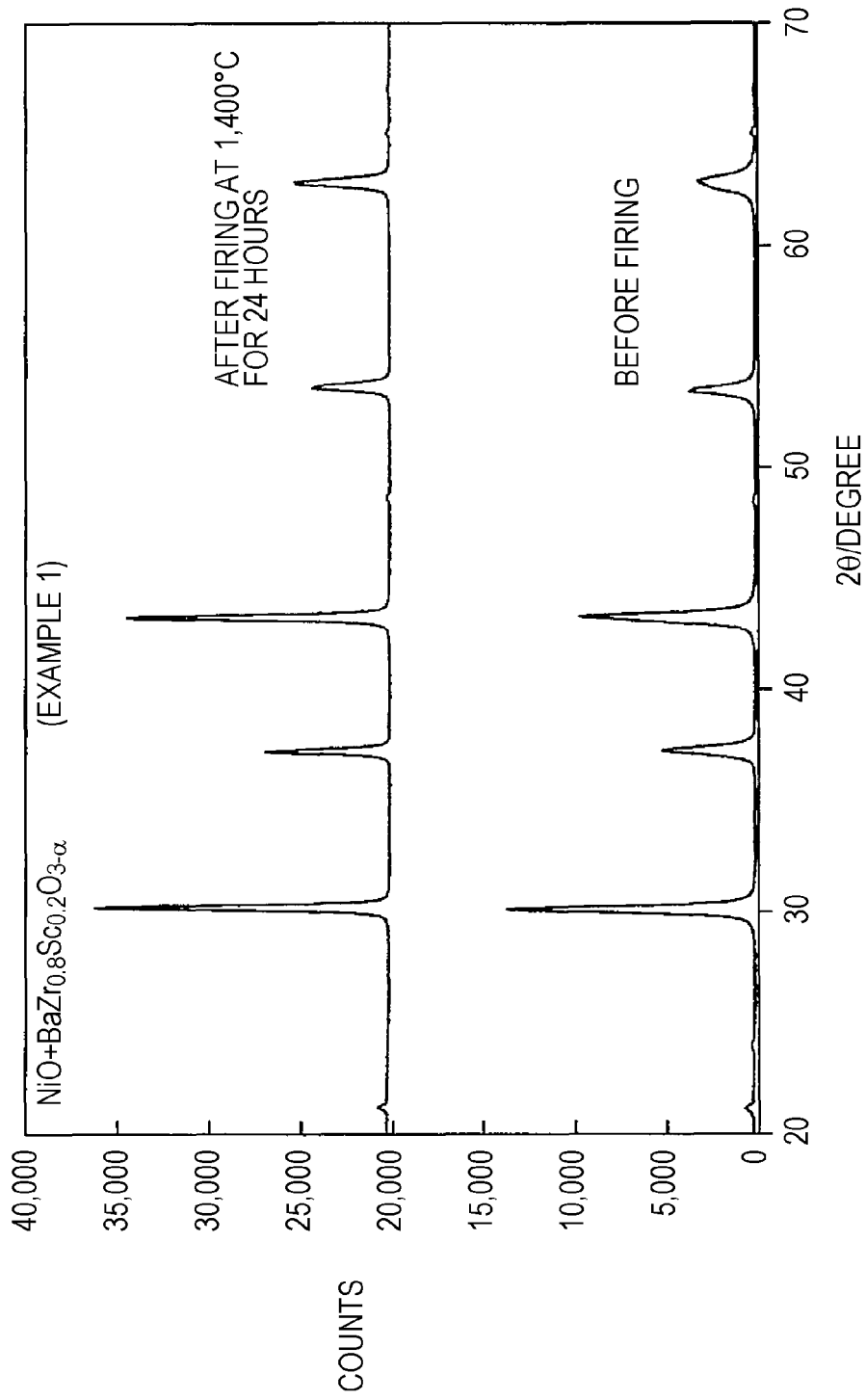
FIG. 10 is a graph showing x-ray structure diffraction measurement results of an electrode material according to Example 1 of the present disclosure.
Figure 11:
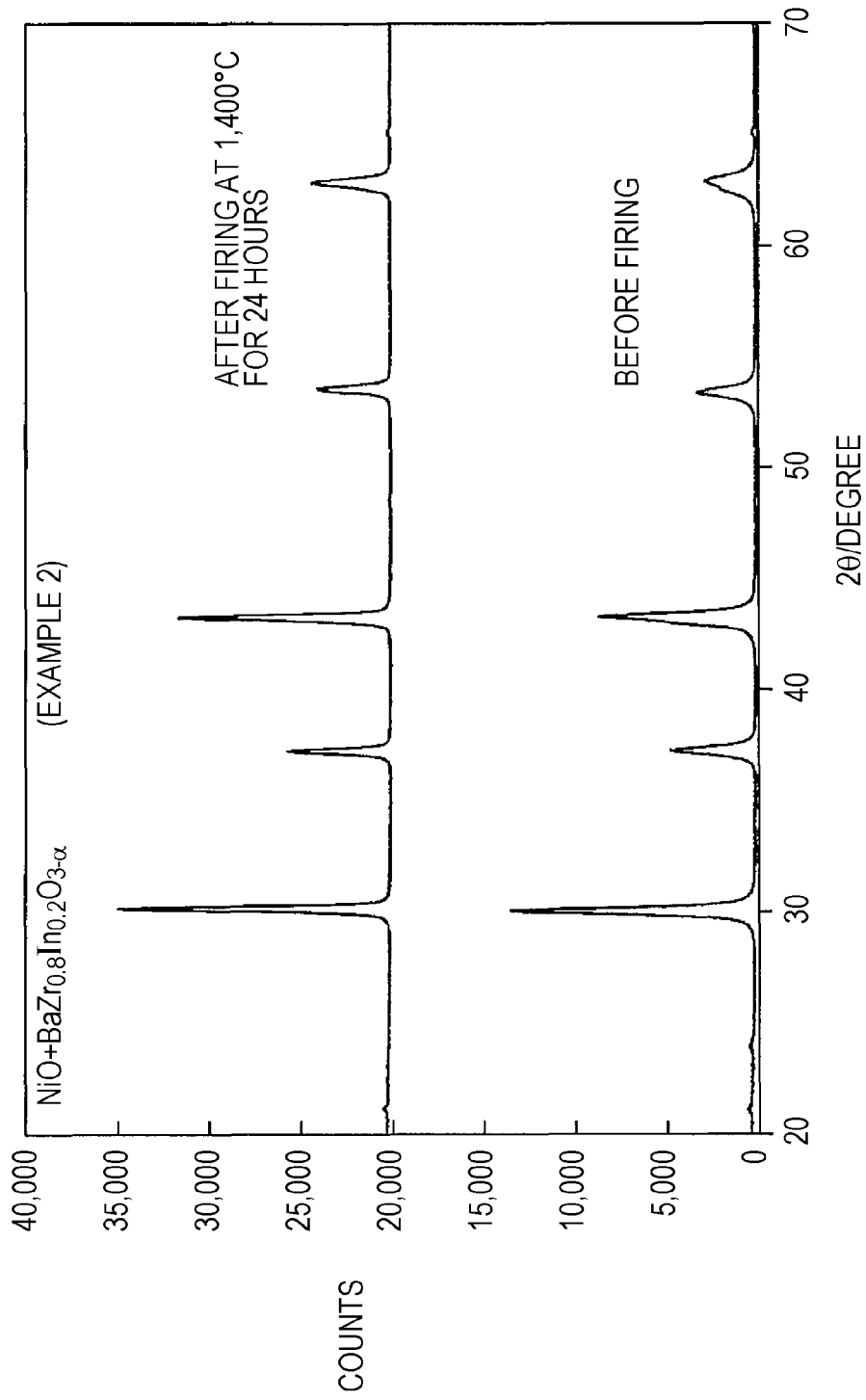
FIG. 11 is a graph showing x-ray structure diffraction measurement results of an electrode material according to Example 2 of the present disclosure.
Figure 12:
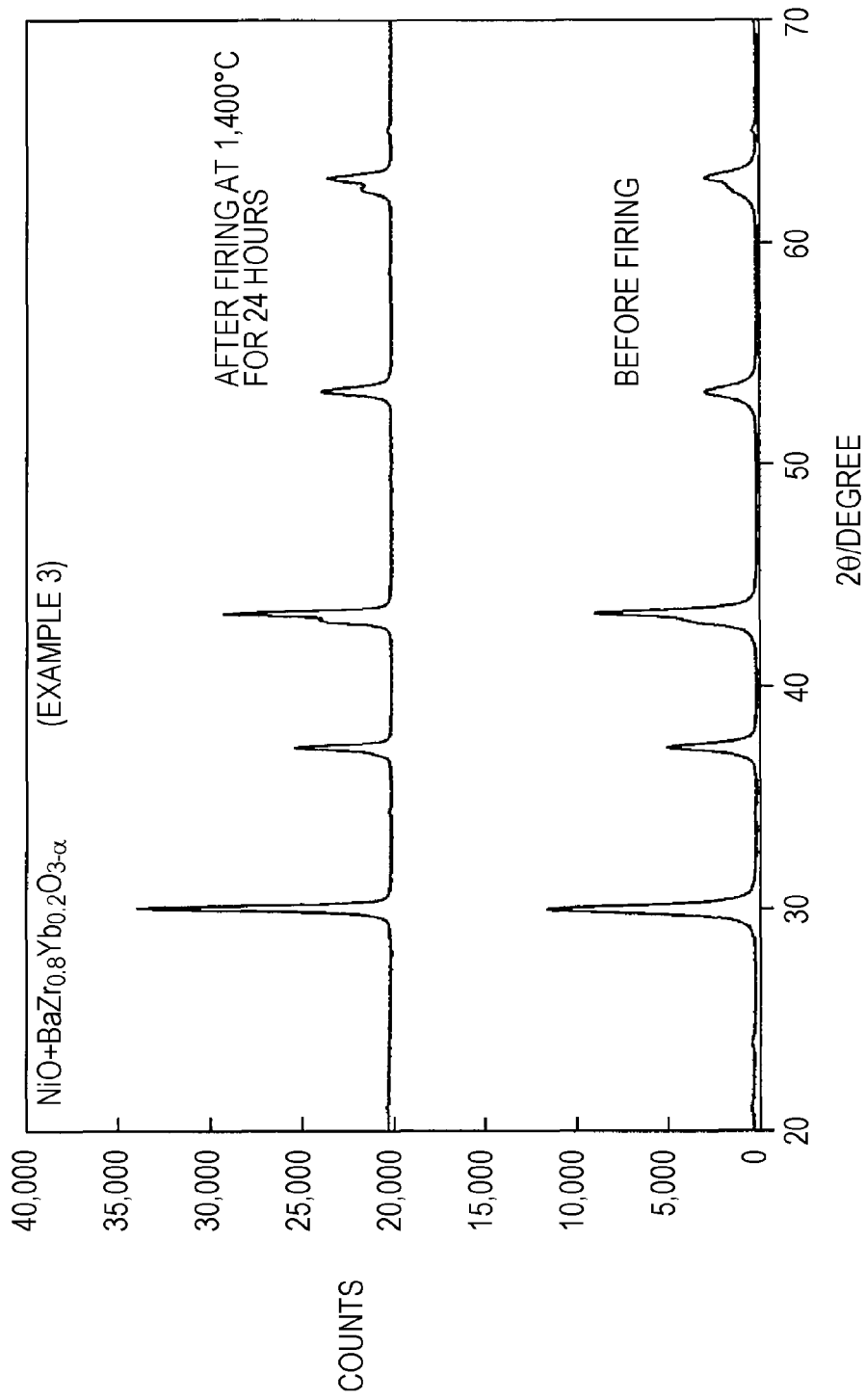
FIG. 12 is a graph showing x-ray structure diffraction measurement results of an electrode material according to Example 3 of the present disclosure.
Figure 13:
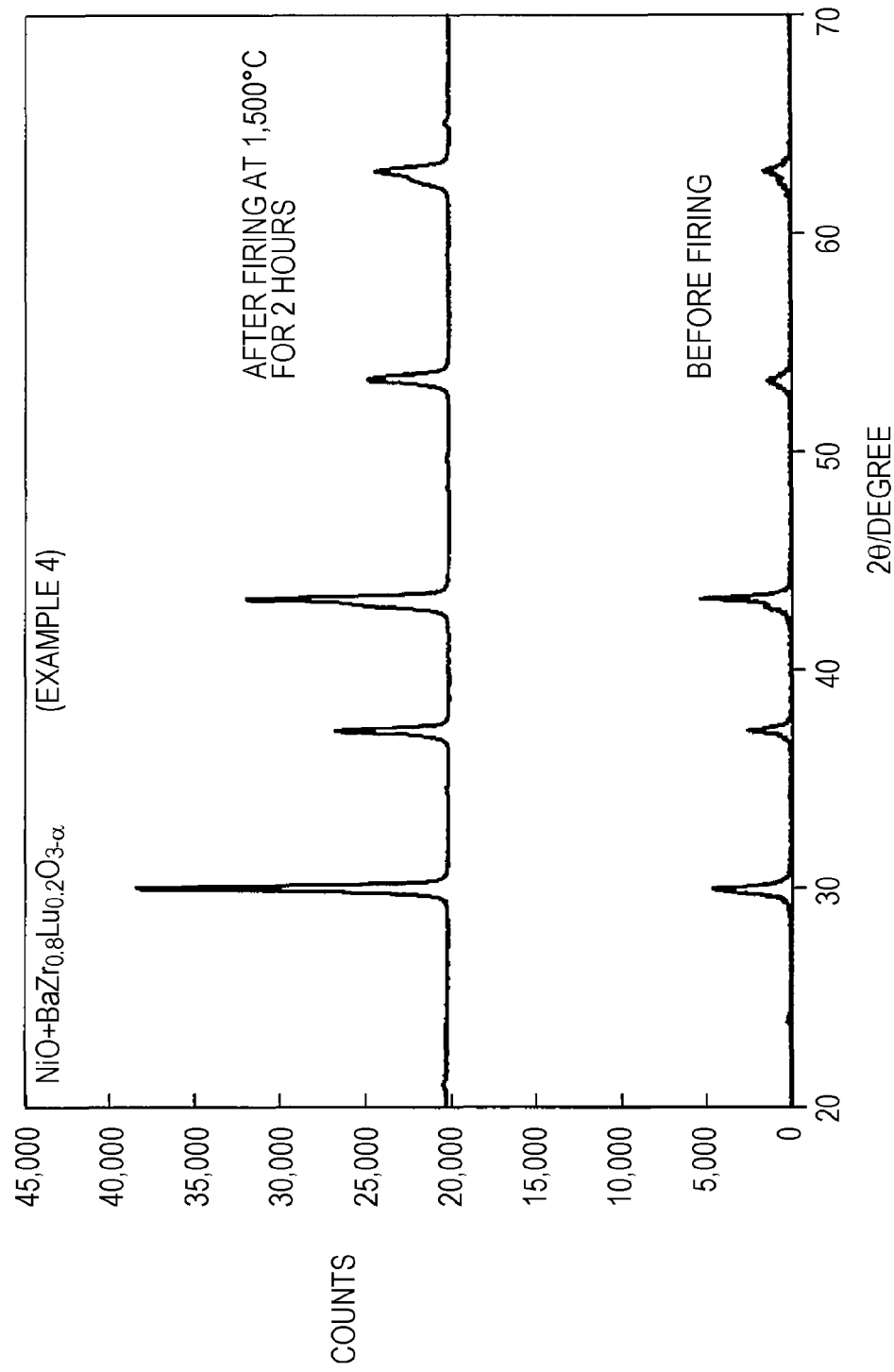
FIG. 13 is a graph showing x-ray structure diffraction measurement results of an electrode material according to Example 4 of the present disclosure.
Figure 14:
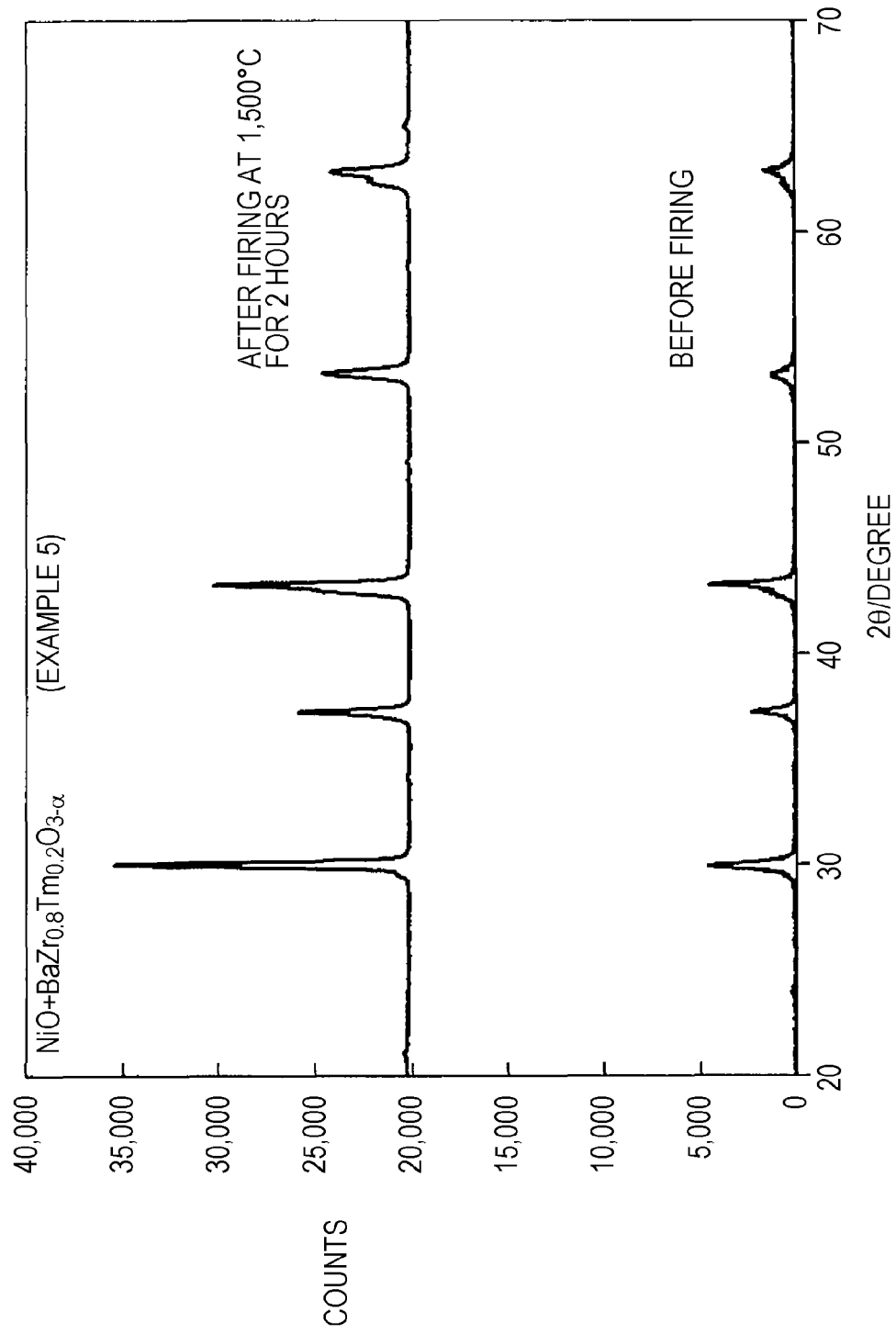
FIG. 14 is a graph showing x-ray structure diffraction measurement results of an electrode material according to Example 5 of the present disclosure.
Figure 15:
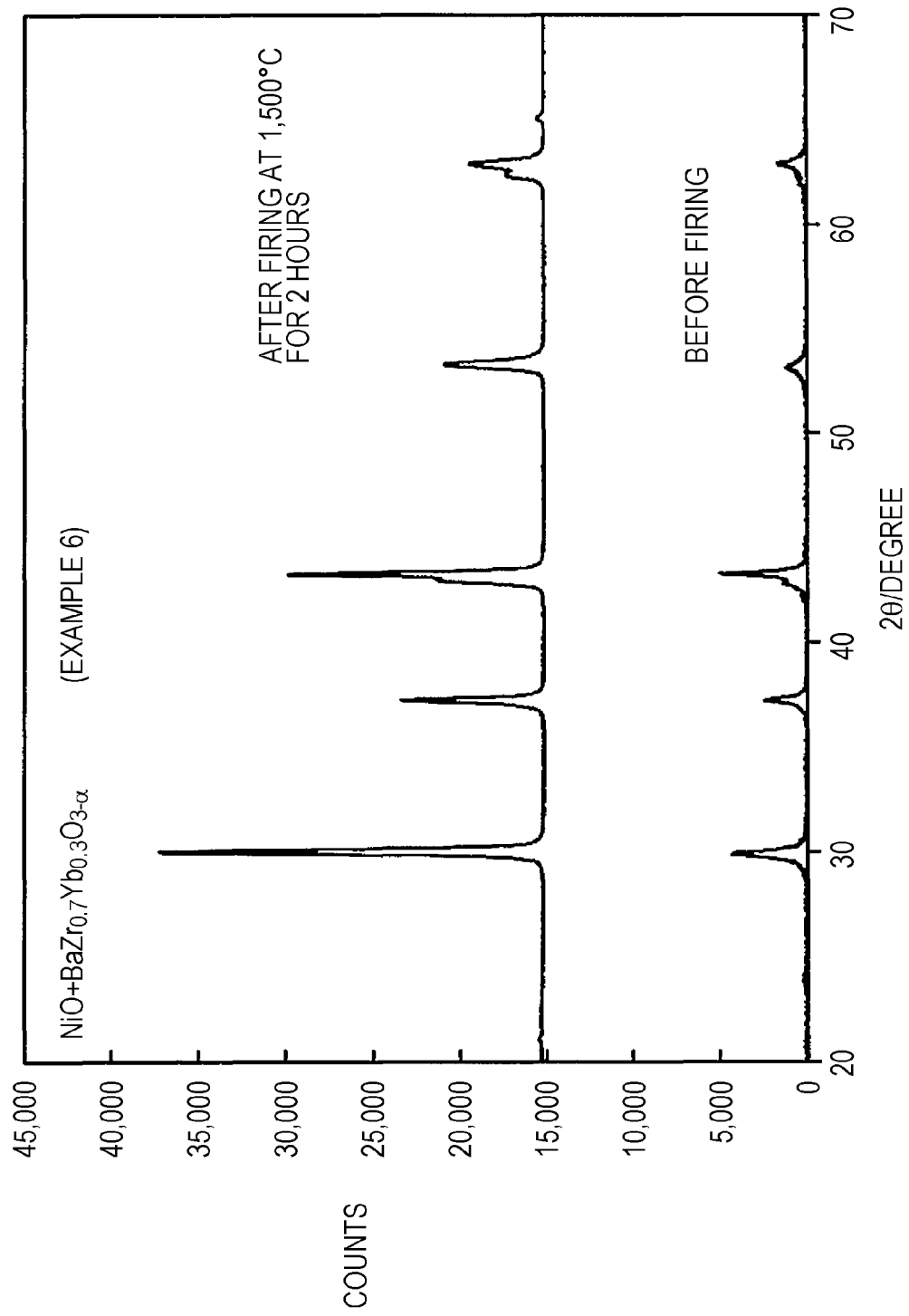
FIG. 15 is a graph showing x-ray structure diffraction measurement results of an electrode material according to Example 6 of the present disclosure.
Figure 16:
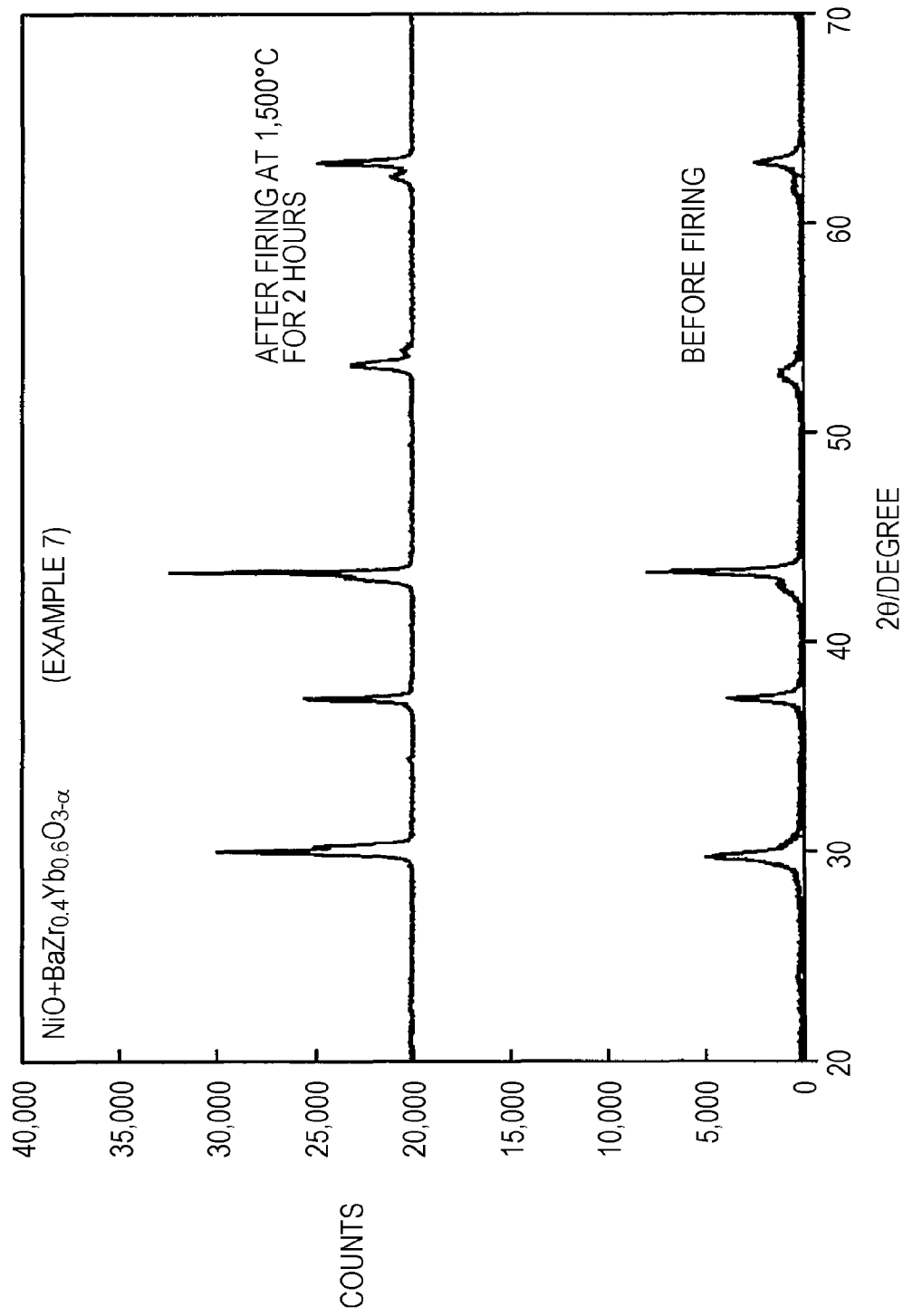
FIG. 16 is a graph showing x-ray structure diffraction measurement results of an electrode material according to Example 7 of the present disclosure.
Figure 17:
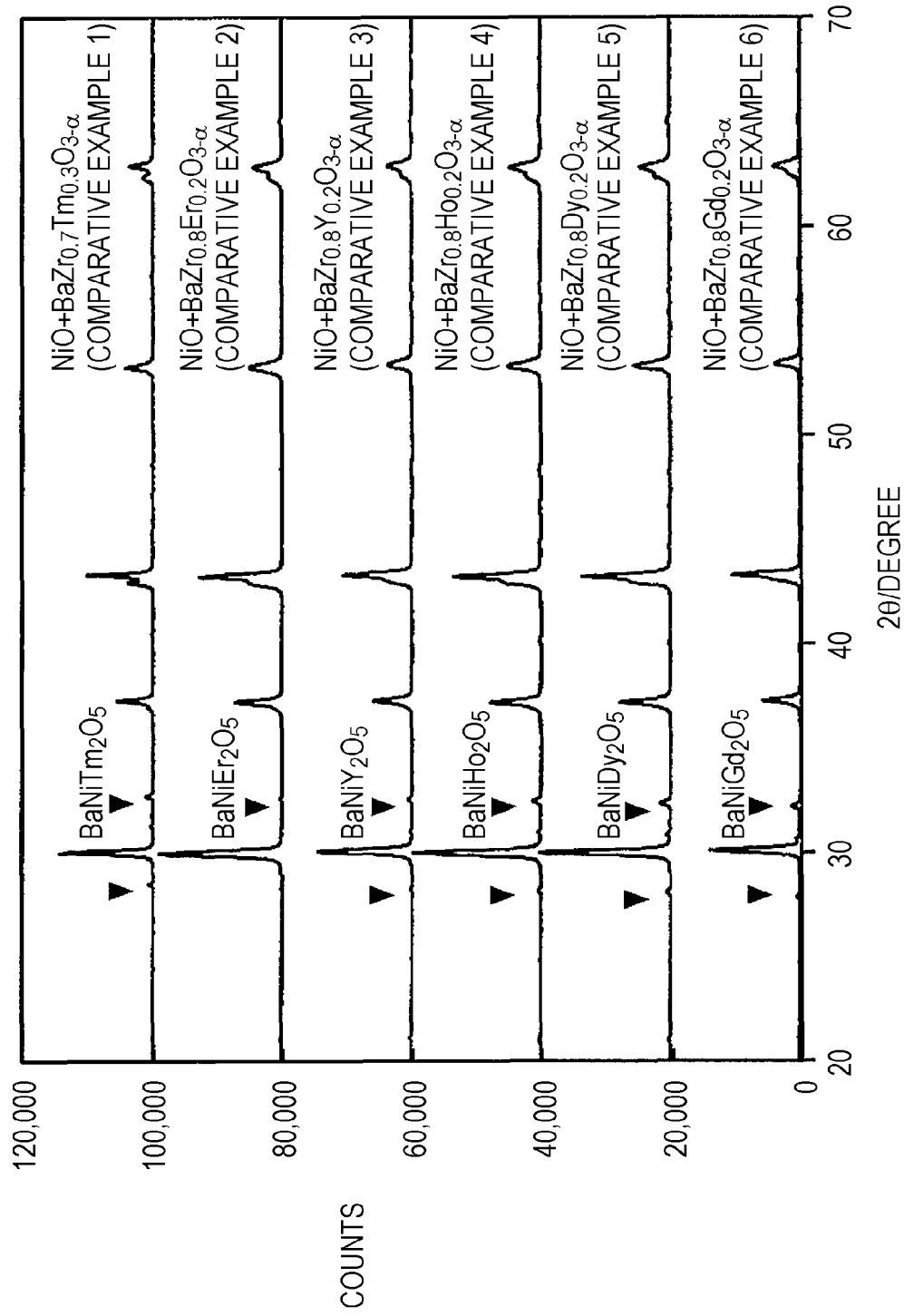
FIG. 17 is a graph showing x-ray structure diffraction measurement results of electrode materials according to Comparative Examples 1 to 6 of the present disclosure.

FIG. 10 is a graph showing x-ray structure diffraction measurement results of the electrode material according to Example 1 of the present disclosure. FIG. 10 shows the x-ray structure diffraction measurement results obtained before and after the firing of a mixed powder of NiO and $BaZr_{0.8}Sc_{0.2}O_{3-\alpha}$ is performed at 1,400° C. FIG. 11 is a graph showing x-ray structure diffraction measurement results of the electrode material according to Example 2 of the present disclosure. FIG. 11 shows the x-ray structure diffraction measurement results obtained before and after the firing of a mixed powder of NiO and $BaZr_{0.8}In_{0.2}O_{3-\alpha}$ is performed at 1,400° C. FIG. 12 is a graph showing x-ray structure diffraction measurement results of the electrode material according to Example 3 of the present disclosure. FIG. 12 shows the x-ray structure diffraction measurement results obtained before and after the firing of a mixed powder of NiO and $BaZr_{0.8}Yb_{0.2}O_{3-\alpha}$ is performed at 1,400° C. FIG. 13 is a graph showing x-ray structure diffraction measurement results of the electrode material according to Example 4 of the present disclosure. FIG. 13 shows the x-ray structure diffraction measurement results obtained before and after the firing of a mixed powder of NiO and $BaZr_{0.8}Lu_{0.2}O_{3-\alpha}$ is performed at 1,500° C. FIG. 14 is a graph showing x-ray structure diffraction measurement results of the electrode material according to Example 5 of the present disclosure. FIG. 14 shows the x-ray structure diffraction measurement results obtained before and after the firing of a mixed powder of NiO and $BaZr_{0.8}Tm_{0.2}O_{3-\alpha}$ is performed at 1,500° C. FIG. 15 is a graph showing x-ray structure diffraction measurement results of the electrode material according to Example 6 of the present disclosure. FIG. 15 shows the x-ray structure diffraction measurement results obtained before and after the firing of a mixed powder of NiO and $BaZr_{0.7}Yb_{0.3}O_{3-\alpha}$ is performed at 1,500° C. FIG. 16 is a graph showing x-ray structure diffraction measurement results of the electrode material according to Example 7 of the present disclosure. FIG. 16 shows the x-ray structure diffraction measurement results obtained before and after the firing of a mixed powder of NiO and $BaZr_{0.4}Yb_{0.6}O_{3-\alpha}$ is performed at 1,500° C. FIG. 17 is a graph showing x-ray structure diffraction measurement results of the electrode materials according to Comparative Examples 1 to 6 of the present disclosure. FIG. 17 shows the x-ray structure diffraction measurement results of sintered bodies of a mixed powder of NiO and $BaZr_{0.8}Y_{0.2}O_{3-\alpha}$, a mixed powder of NiO and $BaZr_{0.7}Tm_{0.3}O_{3-\alpha}$, a mixed powder of NiO and $BaZr_{0.8}Er_{0.2}O_{3-\alpha}$, a mixed powder of NiO and $BaZr_{0.8}Ho_{0.2}O_{3-\alpha}$, a mixed powder of NiO and $BaZr_{0.8}Dy_{0.2}O_{3-\alpha}$, and a mixed powder of NiO and $BaZr_{0.8}Gd_{0.2}O_{3-\alpha}$. In addition, in the graphs shown in FIGS. 10 to 17, the horizontal axis represents the diffraction angle (2θ), and the vertical axis represents the diffraction intensity.

As shown in FIG. 17, from the x-ray structure diffraction measurement results of the fired powders of Comparative Examples 1 to 6, the diffraction peaks identified as $BaNiM_2O_5$ (M represents an element selected from Y, Tm, Er, Ho, Dy, and Gd) were confirmed (triangles shown in FIG. 17). Those diffraction peaks were identified by integrated x-ray powder diffraction software PDXL (manufactured by Rigaku Corporation).

On the other hand, as shown in FIGS. 10 to 16, from the x-ray structure diffraction measurement results of the fired powder of NiO and $BaZr_{0.8}Sc_{0.2}O_{3-\alpha}$ according to Example 1, the fired powder of NiO and $BaZr_{0.8}In_{0.2}O_{3-\alpha}$ according to Example 2, the fired powder of NiO and $BaZr_{0.8}Yb_{0.2}O_{3-\alpha}$ according to Example 3, the fired powder of NiO and $BaZr_{0.8}Lu_{0.2}O_{3-\alpha}$ according to Example 4, the fired powder of NiO and $BaZr_{0.8}Tm_{0.2}O_{3-\alpha}$ according to Example 5, the fired powder of NiO and $BaZr_{0.7}Yb_{0.3}O_{3-\alpha}$ according to Example 6, and the fired powder of NiO and $BaZr_{0.4}Yb_{0.6}O_{3-\alpha}$ according to Example 7, the diffraction peaks derived from $BaNiM_2O_5$ (M represents at least one element selected from Sc, In, Yb, Lu, and Tm) were not confirmed before and after the firing.

Those results were shown in the table of FIG. 18 in connection with the ion radius of the element M (M represents one element selected from Sc, In, Yb, Lu, Tm, Y, Er, Ho, Dy, and Gd) to be added to $BaZrO_3$. FIG. 18 is the table showing the relationship between the ion radius of the element (dopant) to be added to $BaZrO_3$ and the production of $BaNiM_2O_5$. That is, FIG. 18 shows whether $BaNiM_2O_5$ is generated or not from a powder formed in such a way that after a powder obtained by addition of the element (M represents one element selected from Sc, In, Yb, Lu, Tm, Y, Er, Ho, Dy, and Gd) to $BaZrO_3$ is mixed with NiO, firing was performed. As shown in the table of FIG. 18, it is found that by the elements each having an ion radius smaller than that of Tm, $BaNiM_2O_5$ is not generated, and on the other hand, by the elements each having an ion radius larger than that of Tm, $BaNiM_2O_5$ is generated. In addition, $BaNiTm_2O_5$ is not generated from $BaZr_{0.8}Tm_{0.2}O_{3-\alpha}$, and is generated from $BaZr_{0.7}Tm_{0.3}O_{3-\alpha}$.

From the results described above, it is found that when the electrode material is formed of at least one of a first compound having a composition represented by $BaZr_{1-x1}M^1_{x1}O_3$ ($M^1$ represents at least one element selected from trivalent elements each having an ion radius of more than 0.720 A° to less than 0.880 A°, and $0<x_1<1$ holds) and a second compound having a composition represented by $BaZr_{1-x2}Tm_{x2}O_3$ ($0<x_2<0.3$ holds), $BaNiM^1_2O_5$ and/or $BaNiTm_2O_5$ is not generated.

On the other hand, it is found that by a compound having a composition represented by $BaZr_{1-x2}Tm_{x2}O_{3-\alpha}$ ($0.3<x_2<1$ holds) or $BaZr_{1-x3}M^3_{x3}O_3$ ($M^3$ represents at least one element selected from Er, Y, Ho, Dy, and Gd, and $0<x_3<1$ holds), $BaNiTm_2O_5$ or $BaNiM^3_2O_5$ is generated. In addition, when the dopant M represents Tm, depending on the addition amount thereof, $BaNiTm_2O_5$ may be generated or not. On the other hand, when M having an ion radius smaller than that of Tm, such as Yb, is used, as apparent from the results of Examples 3, 6, and 7, even when the addition amount of Yb is changed, a reaction product with NiO is not generated.

(Evaluation of Durability of Reaction Product)

Figure 19:
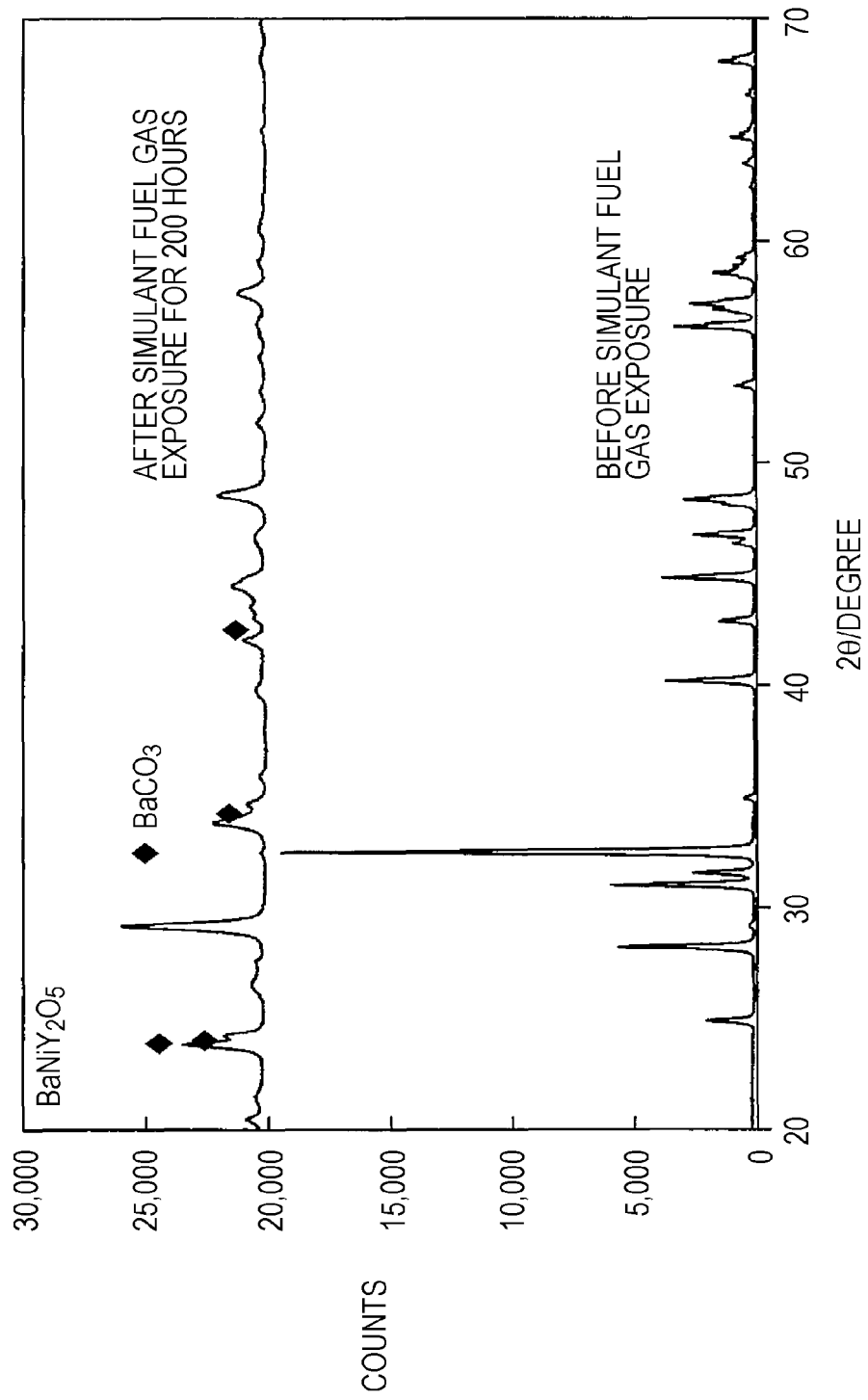
FIG. 19 is a graph showing x-ray structure diffraction measurement results of $BaNiY_2O_5$, which is a reaction product in a fired powder according to Comparative Example 1, before and after simulant fuel gas exposure.

Next, in order to understand the influence of $BaNiM_2O_5$, which is the reaction product contained in the fired powder of each of Comparative Examples 1 to 6, to the electrode, the durability of $BaNiM_2O_5$ against $CO_2$ was evaluated. The result of $BaNiY_2O_5$ is shown in FIG. 19 as a representative example. FIG. 19 is a graph showing the x-ray structure diffraction measurement results obtained before and after stimulant fuel gas exposure is performed on $BaNiY_2O_5$, which is a reaction product of the fired powder of Comparative Example 1. In the graph shown in FIG. 19, the horizontal axis represents the diffraction angle (2θ), and the vertical axis represents the diffraction intensity.

The durability of $BaNiY_2O_5$ against $CO_2$ was evaluated by performing a simulant fuel gas exposure test. In particular, before and after $BaNiY_2O_5$ (manufactured by Kojundo Chemical Laboratory Co., Ltd.) was exposed to a stimulant fuel gas (a mixed gas of $H_2/CO_2=75/25$ percent by volume basis, a dew point of 65° C.) at 600° C. for 200 hours, the x-ray structure diffraction measurement was performed.

As apparent from the graph shown in FIG. 19, it is confirmed that peaks derived from $BaNiY_2O_5$ which are observed before the stimulant fuel gas exposure disappear after the stimulant fuel gas exposure is performed for 200 hours, and furthermore, different peaks appear (see diamond shapes in the graph shown in FIG. 19). Those diffraction peaks are identified as $BaCO_3$ by integrated powder x-ray diffraction software PDXL (manufactured by Rigaku Corporation). Since the peaks derived from $BaCO_3$ are identified, it is clearly found that $BaNiY_2O_5$ is decomposed in the simulant fuel gas, and $BaCO_3$ is generated.

From the results described above, it is found that when the electrode material contains Ni and $BaZr_{1-x}Y_xO_{3-\alpha}$, $BaNiY_2O_5$ is generated by a chemical reaction between Ni and $BaZr_{1-x}Y_xO_{3-\alpha}$ in the firing step. Furthermore, since BaNiY$_2$O$_5$ thus generated is believed to be decomposed by a reaction with CO$_2$, the reason the durability of an electrode containing Ni and BaZr$_{1-x}$Y$_x$O$_{3-\alpha}$ is degraded in a CO$_2$-containing atmosphere can be understood.

As is the electrode material of each of Comparative Examples 1 to 6 described above, a fired powder obtained by mixing NiO and BaZr$_{0.8}$M$_{0.2}$O$_{3-\alpha}$ generates BaNiM$_2$O$_5$ in the firing step. That is, it is believed that in the firing step, since NiO and BaZr$_{0.8}$M$_{0.2}$O$_{3-\alpha}$ react with each other in accordance with the following chemical reaction (1), BaNiM$_2$O$_5$ is generated.

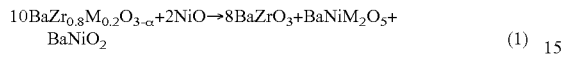
$$10BaZr_{0.8}M_{0.2}O_{3-\alpha} + 2NiO \rightarrow 8BaZrO_3 + BaNiM_2O_5 + BaNiO_2 \quad (1)$$

In addition, in the case in which BaNiM$_2$O$_5$ is generated as a reaction product in the firing step, when BaNiM$_2$O$_5$ is exposed to CO$_2$, the following chemical reaction (2) occurs. In addition, by this chemical reaction, BaNiM$_2$O$_5$ was decomposed to BaCO$_3$.

$$BaNiM_2O_5 + CO_2 + H_2 \rightarrow BaCO_3 + M_2O_3 + Ni + H_2O \quad (2)$$

From the results described above, the present inventors found the reason the durability of BaNiM$_2$O$_5$ against CO$_2$ is remarkably low.

Accordingly, as shown by the electrode material of each of Examples 1 to 7, an electrode material including Ni and a compound represented by at least one of BaZr$_{1-x1}$M$^1_{x1}$O$_3$ (M$^1$ represents at least one element selected from trivalent elements each having an ion radius of more than 0.720 A° to less than 0.880 A°, and 0<x$_1$<1 holds) and BaZr$_{1-x2}$Tm$_{x2}$O$_3$ (0<x$_2$<0.3 holds) generates no BaNiM$^1_2$O$_5$ in the firing step. Hence, it becomes apparent that the electrode material described above is not decomposed to BaCO$_3$ by a reaction with CO$_2$ and has a significantly high durability against CO$_2$ for a long time.

In addition, it is also found that although a proton conductive material represented by BaZrMO$_{3-\alpha}$ has been believed in that past to have a high CO$_2$ durability, in an electrode material which uses Y as M which is a dopant element and which contains a Ni component, the durability against CO$_2$ cannot be sufficiently secured. This finding may also be applied to an electrode of an electrochemical device, a membrane electrode assembly of an electrochemical device, an electrochemical device, an anode of a fuel cell, a membrane electrode assembly of a fuel cell, a fuel cell, an anode of an electrochemical hydrogen pump, an electrochemical hydrogen pump, an electrode of a hydrogen sensor, and a hydrogen sensor.

In addition, Examples 1 to 7 show examples of the electrode materials of Embodiment 1, the modified example of Embodiment 1, Embodiment 2, the modified example of Embodiment 2, Embodiment 3, the modified example of Embodiment 3, Embodiment 4, and modified example of Embodiment 4 of the present disclosure, and the electrode materials are not to be understood to be limited to the materials according to Examples 1 to 7.

The electrode according to the present disclosure may be applied, for example, to an electrochemical device, such as a fuel cell or a gas sensor. In addition, the electrode according to the present disclosure may also be applied, for example, to an electrochemical hydrogen pump, such as a hydrogen refining device or a hydrogen compression device.

What is claimed is:

1. A membrane electrode assembly of an electrochemical device, the membrane electrode assembly comprising:
   a proton conductive solid electrolyte membrane; and
   an electrode including Ni and an electrolyte material which contains as a primary component, at least one of a first compound having a composition represented by BaZr$_{1-x1}$M$^1_{x1}$O$_3$, where M$^1$ represents at least one element selected from the group consisting of Sc and Lu, and 0<x1<1.

2. The membrane electrode assembly of the electrochemical device according to claim 1,
   wherein the electrode contains no compound having a composition represented by BaZr$_{1-x3}$M$^3_{x3}$O$_3$ (M$^3$ represents at least one element selected from Er, Y, Ho, Dy, and Gd, and 0<x$_3$<1 holds).

3. The membrane electrode assembly of the electrochemical device according to claim 1,
   wherein M$^1$ represents Sc.

4. The membrane electrode assembly of the electrochemical device according to claim 1,
   wherein M$^1$ represents Lu.

5. The membrane electrode assembly of the electrochemical device according to claim 1,
   wherein the solid electrolyte membrane includes a first solid electrolyte membrane which includes the electrolyte material containing as the primary component, at least one of a fourth compound having a composition represented by BaZr$_{1-x4}$M$^4_{x4}$O$_3$, where M$^4$ represents at least one element selected from trivalent elements each having an ion radius of more than 0.720 A° to less than 0.880 A°, and 0<x$_4$<1 holds, and a fifth compound having a composition represented by BaZr$_{1-x5}$Tm$_{x5}$O$_3$, where 0<x$_5$<0.3 holds, and
   the electrode is in contact with the first solid electrolyte membrane.

6. The membrane electrode assembly of the electrochemical device according to claim 5,
   wherein M$^4$ represents at least one element selected from Sc, In, Lu, and Yb.

7. The membrane electrode assembly of the electrochemical device according to claim 5,
   wherein the solid electrolyte membrane further includes a second solid electrolyte membrane containing a sixth compound having a composition represented by one of BaZr$_{1-x6}$M$^6_{x6}$O$_3$, BaCe$_{1-x7}$M$^7_{x7}$O$_3$, and BaZr$_{1-x8-y8}$Ce$_{x8}$M$^8_{y8}$O$_3$, where M$^6$, M$^7$, and M$^8$ each represent at least one element selected from La, Pr, Nd, Pm, Sm, Eu, Gd, Tb, Dy, Ho, Er, Tm, Yb, Y, Sc, Mn, Fe, Co, Ni, Al, Ga, In, and Lu, and 0<x$_6$<1, 0<x$_7$<1, 0<x$_8$<1, and 0<y$_8$<1 hold,
   the first solid electrolyte membrane is in contact at one side surface thereof with the electrode and is in contact with the second solid electrolyte membrane at the other side surface opposite to the one side surface, and
   the electrode, the first solid electrolyte membrane, and the second solid electrolyte membrane are laminated to each other in this order.

8. A fuel cell comprising:
   a proton conductive solid electrolyte membrane;
   an anode including Ni and an electrolyte material which contains as a primary component, at least one of a first compound having a composition represented by BaZr$_{1-x1}$M$^1_{x1}$O$_3$, where M$^1$ represents at least one element selected from the group consisting of Sc and Lu, and 0<X1<1;

a cathode;

an anode gas path supplying a hydrogen-containing gas to the anode; and a cathode gas path supplying an oxidant gas to the cathode, wherein the solid electrolyte membrane is in contact at one side surface thereof with the anode and in contact with the cathode at the other side surface opposite to the one side surface, the anode, the solid electrolyte membrane, and the cathode are laminated to each other in this order, and the hydrogen-containing gas contains $CO_2$.

9. The fuel cell according to claim 8, further comprising a reformer which reforms a raw material to be supplied and generates the hydrogen-containing gas.

10. The membrane electrode assembly of the electrochemical device according to claim 1, wherein $0.2 \leq x_1 < 1$.

11. The membrane electrode assembly of the electrochemical device according to claim 8, wherein $0.2 \leq x_1 < 1$.

* * * * *